(12) United States Patent
Storan et al.

(10) Patent No.: US 8,627,356 B2
(45) Date of Patent: Jan. 7, 2014

(54) METHOD AND APPARATUS FOR TELEVISION PROGRAM PROMOTION

(75) Inventors: Jeffrey Storan, Brooklyn, NY (US); Patrick Angeles, Sonoma, CA (US); Dave Morgan, New York, NY (US)

(73) Assignee: Simulmedia, Inc., New York, NY (US)

(*) Notice: Subject to any disclaimer, the term of this patent is extended or adjusted under 35 U.S.C. 154(b) by 701 days.

(21) Appl. No.: 12/714,937

(22) Filed: Mar. 1, 2010

(65) Prior Publication Data

US 2010/0269134 A1 Oct. 21, 2010

Related U.S. Application Data

(60) Provisional application No. 61/160,115, filed on Mar. 13, 2009.

(51) Int. Cl.
*H04N 21/258* (2011.01)
*H04N 21/262* (2011.01)
*H04N 21/25* (2011.01)

(52) U.S. Cl.
CPC .... *H04N 21/25833* (2013.01); *H04N 21/25891* (2013.01); *H04N 21/252* (2013.01); *H04N 21/26258* (2013.01)
USPC .......................................................... 725/34

(58) Field of Classification Search
USPC ................................................... 725/32–36
See application file for complete search history.

(56) References Cited

U.S. PATENT DOCUMENTS

| | | |
|---|---|---|
| 5,446,919 A | 8/1995 | Wilkins |
| 5,600,364 A | 2/1997 | Hendricks et al. |
| 5,636,346 A | 6/1997 | Saxe |
| 6,002,393 A | 12/1999 | Hite et al. |
| 6,020,883 A | 2/2000 | Herz et al. |
| 6,036,601 A | 3/2000 | Heckel |
| 6,128,663 A | 10/2000 | Thomas |
| 6,286,005 B1 | 9/2001 | Cannon |

(Continued)

FOREIGN PATENT DOCUMENTS

| | | |
|---|---|---|
| JP | 2006184944 | 7/2006 |
| WO | WO 02/37384 A2 | 5/2002 |

OTHER PUBLICATIONS

International Search Report for PCT/US2010/025790 dated Apr. 29, 2010.

*Primary Examiner* — Bennett Ingvoldstad
(74) *Attorney, Agent, or Firm* — Fahmi, Sellers, Embert & Davitz

(57) ABSTRACT

A computer implemented method and apparatus for determining an optimal time and channel for delivery of television advertising content based on viewer profile information is disclosed. The method and apparatus provide for collecting viewer profile information for a viewer and storing it in a computer memory. Segments of viewers may be defined by viewer profile information thresholds in the computer memory. Viewers may be assigned to an audience segment based on a comparison of the viewer profile information thresholds with the collected viewer profile information. Information describing programs to be promoted, spots in which promotions for such programs may air, and geographic data also may be collected and stored. The computer may determine an optimal time and channel for delivery of the television advertising content to a selected audience segment based on the program to be promoted information, spot information and geographic data. The method and apparatus may be of particular use in determining optimal channels and times for promotion of a television program on a channel/network other than the channel/network on which the program is to air (i.e., cross-network promotion).

21 Claims, 17 Drawing Sheets

(56) References Cited

U.S. PATENT DOCUMENTS

| | | |
|---|---|---|
| 6,463,585 B1 | 10/2002 | Hendricks et al. |
| 6,477,704 B1 | 11/2002 | Cremia |
| 6,539,375 B2 | 3/2003 | Kawasaki |
| 6,615,039 B1 | 9/2003 | Eldering |
| 6,718,551 B1 | 4/2004 | Swix et al. |
| 6,738,978 B1 | 5/2004 | Hendricks et al. |
| 6,820,277 B1 | 11/2004 | Eldering et al. |
| 6,868,389 B1 | 3/2005 | Wilkins et al. |
| 7,043,531 B1 | 5/2006 | Seibel et al. |
| 7,065,550 B2 | 6/2006 | Raghunandan |
| 7,100,183 B2 | 8/2006 | Kunkel et al. |
| 7,136,871 B2 | 11/2006 | Ozer et al. |
| 7,139,723 B2 | 11/2006 | Conkwright et al. |
| 7,146,329 B2 | 12/2006 | Conkwright et al. |
| 7,185,353 B2 | 2/2007 | Schlack |
| 7,194,421 B2 | 3/2007 | Conkwright et al. |
| 7,194,424 B2 | 3/2007 | Greer et al. |
| 7,197,472 B2 | 3/2007 | Conkwright et al. |
| 7,228,555 B2 | 6/2007 | Schlack |
| 7,236,941 B2 | 6/2007 | Conkwright et al. |
| 7,240,022 B1 | 7/2007 | Bistriceanu et al. |
| 7,243,129 B1 | 7/2007 | Thomas |
| 7,260,823 B2 | 8/2007 | Schlack et al. |
| 7,302,419 B2 | 11/2007 | Conkwright et al. |
| 7,328,448 B2 | 2/2008 | Eldering et al. |
| 7,331,057 B2 * | 2/2008 | Eldering et al. ................. 725/32 |
| 7,356,547 B2 | 4/2008 | Ozer et al. |
| 7,370,073 B2 | 5/2008 | Yen et al. |
| 7,370,342 B2 | 5/2008 | Ismail et al. |
| 7,383,243 B2 | 6/2008 | Conkwright et al. |
| 7,406,434 B1 | 7/2008 | Chang et al. |
| 7,487,523 B1 | 2/2009 | Hendricks |
| 7,536,316 B2 | 5/2009 | Ozer et al. |
| 7,546,619 B2 | 6/2009 | Anderson et al. |
| 7,552,458 B1 | 6/2009 | Finseth et al. |
| 7,562,064 B1 | 7/2009 | Chickering et al. |
| 7,584,490 B1 * | 9/2009 | Schlack ........................... 725/35 |
| 7,587,731 B1 | 9/2009 | Oyabu et al. |
| 2001/0042002 A1 | 11/2001 | Koopersmith |
| 2002/0019774 A1 | 2/2002 | Kanter |
| 2002/0022996 A1 | 2/2002 | Sanborn et al. |
| 2002/0026359 A1 | 2/2002 | Long et al. |
| 2002/0052774 A1 | 5/2002 | Parker et al. |
| 2002/0056093 A1 | 5/2002 | Kunkel et al. |
| 2002/0083439 A1 | 6/2002 | Eldering |
| 2002/0095332 A1 | 7/2002 | Doherty et al. |
| 2002/0099605 A1 | 7/2002 | Weitzman et al. |
| 2002/0104083 A1 | 8/2002 | Hendricks et al. |
| 2002/0116258 A1 | 8/2002 | Stamatelatos et al. |
| 2002/0138284 A1 | 9/2002 | DeCotiis et al. |
| 2002/0138285 A1 | 9/2002 | DeCotiis et al. |
| 2002/0138333 A1 | 9/2002 | DeCotiis et al. |
| 2002/0138334 A1 | 9/2002 | DeCotiis et al. |
| 2002/0152117 A1 | 10/2002 | Cristofalo et al. |
| 2003/0023489 A1 | 1/2003 | McGuire et al. |
| 2003/0036944 A1 | 2/2003 | Lesandrini et al. |
| 2003/0036949 A1 | 2/2003 | Kaddeche et al. |
| 2003/0041156 A1 | 2/2003 | Pickover et al. |
| 2003/0101451 A1 | 5/2003 | Bentolila et al. |
| 2003/0101454 A1 | 5/2003 | Ozer et al. |
| 2003/0145323 A1 | 7/2003 | Hendricks et al. |
| 2003/0172374 A1 * | 9/2003 | Vinson et al. ..................... 725/9 |
| 2003/0220833 A1 | 11/2003 | Benderev |
| 2004/0083133 A1 | 4/2004 | Nicholas et al. |
| 2004/0122735 A1 | 6/2004 | Meshkin |
| 2004/0133480 A1 | 7/2004 | Domes |
| 2004/0163101 A1 | 8/2004 | Swix et al. |
| 2004/0243623 A1 | 12/2004 | Ozer et al. |
| 2005/0091104 A1 | 4/2005 | Abraham |
| 2005/0120045 A1 | 6/2005 | Klawon |
| 2005/0251820 A1 | 11/2005 | Stefanik et al. |
| 2006/0085254 A1 | 4/2006 | Grim, III et al. |
| 2006/0085263 A1 | 4/2006 | Greer et al. |
| 2006/0122857 A1 | 6/2006 | DeCotiis et al. |
| 2006/0127869 A1 | 6/2006 | Fields et al. |
| 2006/0265507 A1 | 11/2006 | Banga et al. |
| 2007/0156532 A1 | 7/2007 | Nyhan et al. |
| 2007/0199017 A1 | 8/2007 | Cozen et al. |
| 2007/0244753 A1 | 10/2007 | Grouf et al. |
| 2008/0034386 A1 | 2/2008 | Cherry et al. |
| 2008/0059308 A1 | 3/2008 | Gerken |
| 2008/0077478 A1 | 3/2008 | Kim |
| 2008/0082396 A1 | 4/2008 | O'Connor et al. |
| 2008/0082397 A1 | 4/2008 | Dennison et al. |
| 2008/0091516 A1 | 4/2008 | Giunta |
| 2008/0109376 A1 | 5/2008 | Walsh et al. |
| 2008/0114648 A1 | 5/2008 | Chen et al. |
| 2008/0127252 A1 | 5/2008 | Eldering et al. |
| 2008/0133370 A1 | 6/2008 | Gehlot et al. |
| 2008/0189734 A1 | 8/2008 | Schepers et al. |
| 2008/0195468 A1 | 8/2008 | Malik |
| 2008/0199042 A1 | 8/2008 | Smith |
| 2008/0221987 A1 | 9/2008 | Sundaresan et al. |
| 2008/0235722 A1 | 9/2008 | Baugher et al. |
| 2008/0243614 A1 | 10/2008 | Tu et al. |
| 2008/0249858 A1 | 10/2008 | Angell et al. |
| 2008/0271070 A1 | 10/2008 | Kanojia et al. |
| 2008/0276270 A1 | 11/2008 | Kotaru et al. |
| 2008/0281687 A1 | 11/2008 | Hurwitz et al. |
| 2008/0281711 A1 | 11/2008 | Bridges et al. |
| 2008/0319786 A1 | 12/2008 | Stivoric et al. |
| 2009/0030801 A1 | 1/2009 | Meggs |
| 2009/0063250 A1 | 3/2009 | Burgess et al. |
| 2009/0063268 A1 | 3/2009 | Burgess et al. |
| 2009/0063278 A1 | 3/2009 | Song et al. |
| 2009/0063283 A1 | 3/2009 | Kusumoto et al. |
| 2009/0075738 A1 | 3/2009 | Pearce |
| 2009/0094096 A1 | 4/2009 | Riise et al. |
| 2009/0094640 A1 | 4/2009 | Anderson et al. |
| 2009/0100047 A1 | 4/2009 | Jones |
| 2009/0112701 A1 | 4/2009 | Turpin et al. |
| 2009/0113468 A1 | 4/2009 | Steelberg et al. |
| 2009/0119172 A1 | 5/2009 | Soloff |
| 2009/0119173 A1 | 5/2009 | Parsons et al. |
| 2009/0125399 A1 | 5/2009 | Weathersby |
| 2009/0132342 A1 | 5/2009 | Klinger et al. |
| 2009/0132373 A1 | 5/2009 | Redlich |
| 2009/0132374 A1 | 5/2009 | Weathersby |
| 2009/0138329 A1 | 5/2009 | Wanker |
| 2009/0157507 A1 | 6/2009 | Agius et al. |
| 2009/0172725 A1 | 7/2009 | Heilbron et al. |
| 2009/0186704 A1 | 7/2009 | Goldberg et al. |
| 2009/0187939 A1 * | 7/2009 | Lajoie ............................. 725/34 |
| 2009/0228912 A1 | 9/2009 | Reynolds et al. |
| 2009/0228914 A1 | 9/2009 | Wong et al. |
| 2011/0016482 A1 * | 1/2011 | Tidwell et al. ................... 725/14 |

* cited by examiner

| TITLE-TIME (CHANNEL) | TARGET REACH | ALL VIEWERS | % VIEWERS | INDEX | FUTURE SCHEDULE |
|---|---|---|---|---|---|
| STAR TREK: ENTERPRISE-04:00 PM (SYFY) | 22,578 | 57,989 | 39.64% | 392 | MON, FEB 01 AT 3:00PM, 4:00PM, 5:00PM |
| STARGATE ATLANTIS-05:00 PM (SYFY) | 21,084 | 55,493 | 38.81% | 384 | WED, FEB 03 AT 5:00PM (CF 50%) |
| SCRUBS-08:30 PM (COMEDY) | 13,534 | 35,142 | 38.53% | 383 | TUE, FEB 02 AT 8:00PM, 8:30PM |
| THE OFFICE-09:30 PM (TBS) | 26,463 | 66,920 | 39.55% | 382 | TUES, FEB 02 AT 8:30PM, 9:00PM, 9:30PM, 10:00PM, 10:30PM |
| THE DAILY SHOW WITH JON STEWART-07:00 PM (COMEDY) | 12,961 | 35,327 | 38.03% | 377 | TUE, FEB 02 AT 7:00PM; WED, FEB 03 AT 7:00PM; THU, FEB 04 AT 7:00 PM |
| BIG CAT DIARY-02:30 PM (APL) | 10,964 | 28,604 | 38.36% | 369 | MON, FEB 01 AT 3:00PM (CF 50%), 3:30 PM (CF 50%); TUES, FEB 02 AT 3:00PM (CF 50%), 3:30PM (CF 50%); WED, FEB03 AT 3:00PM (CF 50%), 3:30PM (CF 50%); THU, FEB 04 AT 3:00PM (CF 50%), 3:30PM (CF 50%) |
| MY NAME IS EARL-07:30 PM (TBS) | 29,878 | 80,071 | 37.34% | 363 | NO SHOWINGS WITHIN SPECIFIED WINDOW |
| MALCOLM IN THE MIDDLE-03:30 PM (FX) | 11,954 | 31,593 | 37.91% | 358 | MON, FEB 01 AT 2:30PM; TUE, FEB 02 AT 2:30PM, 3:00PM; WED, FEB 03 AT 2:30PM, 3:00PM |
| CASH CAB-05:00 PM (DISCOVERY) | 10,399 | 28,776 | 36.14% | 351 | MON, FEB 01 AT 5:00PM (CF 50%), 5:30PM (CF 50%), 6:00PM (CF 50%); TUE, FEB 02 AT 5:00PM (CF 50%), 5:30PM (CF 50%), 6:00PM (CF 50%); WED, FEB 03 AT 5:00PM (CF 50%), 5:30PM (CF 50%), 6:00PM (CF 50%); THU, FEB 04 AT 5:00PM (CF 50%), 5:30PM (CF 50%), 6:00PM (CF 50%) |
| NAKED SCIENCE-10:00 AM (NGC) | 10,709 | 29,962 | 35.97% | 349 | THU, FEB 04 AT 9:00AM, 10:00AM |

TO FIG. 15 (CON'T)

*FIG. 15*

FROM FIG. 15

| | | | |
|---|---|---|---|
| SOUTH PARK-09:30 PM (COMEDY) | 26,862 | | |
| THE CONQUERORS-03:00 PM (HISTINTL) | 11,086 | 73,912 | 36.11% | MON, FEB 01 AT 10:20PM; TUE, FEB 02 AT 9:00PM, 9:30PM, 10:00PM, 10:20PM; WED, FEB 03 AT 10:00PM; THU, FEB 04 AT 9:00PM, 9:30PM |
| | | 29,962 | 37.00% | NO SHOWINGS WITHIN SPECIFIED WINDOW |
| ANTIQUES ROADSHOW-03:00 PM (BBCA) | 10,691 | 29,443 | 36.37% | MON, FEB 01 AT 2:00PM (CF 50%), 3:00PM (CF 50%), 4:00PM (CF 50%); TUE, FEB 02 AT 2:00PM (CF 50%), 3:00PM (CF 50%), 4:00PM (CF 50%); WED, FEB 03 AT 2:00PM (CF 50%), 3:00PM (CF 50%), 4:00PM (CF 50%); THU, FEB 04 AT 2:00PM (CF 50%), 3:00PM (CF 50%), 4:00PM (CF 50%) |
| DIRTY JOBS-09:00 PM (DISCOVERY) | 58,597 | 162,343 | 35.28% | TUE, FEB 02 AT 8:00PM (CF 50%), 9:00PM (CF 50%) |
| PAWN STARS-10:00 PM (HISTORY) | 46,957 | 133,035 | 34.68% | MON, FEB 01 AT 10:00PM, 10:30PM; THU, FEB 04 AT 10:00PM, 10:30PM |
| ASK THIS OLD HOUSE-07:30 PM (DIY) | 11,851 | 34,311 | 34.52% | MON, FEB 01 AT 7:30PM; TUE, FEB 02 AT 7:30PM; WED, FEB 03 AT 7:30PM; THU, FEB 04 AT 7:30PM |
| SCI FI SCIENCE-10:30 PM (SCIENCE) | 10,619 | 31,051 | 34.41% | NO SHOWINGS WITHIN SPECIFIED WINDOW |
| DEADLIEST CATCH-11:00 AM (DISCOVERY) | 17,643 | 51,190 | 35.00% | NO SHOWINGS WITHIN SPECIFIED WINDOW |
| BIOGRAPHY-12:00 PM (BIO) | 10,542 | 31,655 | 33.30% | NO SHOWINGS WITHIN SPECIFIED WINDOW |
| ANIMAL PLANET'S MOST OUTRAGEOUS-03:00 PM (APL) | 12,230 | 36,819 | 33.33% | UNIDENTIFIED PROGRAM |
| NASCAR RACING-12:00 PM (SPEED) | 10,313 | 30,424 | 33.90% | TUE, FEB 02 AT 12:30PM (CF 50%); WED, FEB 03 AT 12:00PM (CF 50%); THU, FEB 04 AT 12:00PM (CF 50%) |

1100

FIG. 15
*(CON'T)*

METHOD AND APPARATUS FOR TELEVISION PROGRAM PROMOTION

CROSS-REFERENCE TO RELATED APPLICATIONS

The present invention and application relates to, and claims the benefit of the earlier filing date and priority of U.S. Provisional Patent Application 61/160,115 filed Mar. 13, 2009, which is hereby incorporated by reference in its entirety.

FIELD OF THE INVENTION

The present invention relates to methods and apparatus for determining an optimal time, channel, and/or cost for display of a television promotion, and methods and apparatus for planning, effecting, and/or charging for such display.

BACKGROUND OF THE INVENTION

Currently, typical cable, fiber optic and satellite television services deliver hundreds of television channels to viewers. While viewers may benefit from this increased number of programs to chose from, it is frequently difficult for viewers to be aware of all of the programming choices available to them, and therefore very difficult for them to identify the programs they would prefer to watch. If a viewer were to channel "surf" through all available channels to identify the best program to watch, there would be little time left to view the program. Thus, the increased value of television resulting from increased choice may be offset to a large degree by the difficulty viewers have in identifying the programs that best meet their media consumption profile.

The increased number of available channels also has negative repercussions for television content providers, (e.g., cable television networks) and television service providers (e.g., cable operators) because they are faced with extraordinary competition for each viewer's available viewing time. Given the number of channels available, the viewer may fail to discover the best channel and best program for her media consumption profile (i.e., viewer profile) due to the overwhelming amount of choice available to her.

One method that television content providers have utilized to attract viewers to a channel and/or a program has been to use cross-network promotion. Cross-network promotion exists when a television content provider advertises a program that will air on its own channel or network in a spot or "avail" on another channel or network. Such promotion can be expensive, however, and thus there is a need for optimizing the selection of the channels, programs, and/or time for placement of such cross-network promotions. Furthermore, there is a need to optimize such selection based on viewer profile information. In the context of the present application, the terms "optimize" and "optimizing," and all derivatives of these terms, are intended to refer to an improvement or increased effectiveness of cross-network promotion or provision of television content generally, and do not imply that the improvement or increased effectiveness is necessarily maximized.

It is therefore an advantage of some, but not necessarily all, embodiments of the present invention to provide computer-implemented methods and apparatus for optimizing the selection of times, channels, and programs for cross-network promotion of television programs. It is a further advantage of some, but not necessarily all, embodiments of the present invention to provide computer-implemented methods and apparatus for optimizing cross-network promotion of television programs based on viewer profile information. It is still a further advantage of some, but not necessarily all, embodiments of the present invention to optimize cross-network advertising based on viewer profile information. The aforenoted optimization may take into account information relating to the program to be promoted, the channel to be promoted, the channel on which the promotion will air, the program or programs that will "carry" the promotion, promotion cost, spot availability, and viewer profile information, such as, but not limited to viewer demographics, geographic data, and viewing data, among others.

Additional advantages of various embodiments of the invention are set forth, in part, in the description that follows and, in part, will be apparent to one of ordinary skill in the art from the description and/or from the practice of the invention.

SUMMARY OF THE INVENTION

Responsive to the foregoing challenges, Applicants have developed an innovative computer implemented method of determining an optimal time and channel for delivery of television advertising content based on viewer profile information, comprising the steps of: collecting viewer profile information for a viewer; storing the viewer profile information in a computer memory; storing a definition of one or more modal segments of viewers in terms of one or more viewer profile information thresholds in the computer memory; assigning the viewer to one or more modal segments based on a computer implemented comparison of the one or more viewer profile information thresholds with the collected viewer profile information; determining with said computer an optimal time and channel for delivery of television advertising content based on viewer assignment to the one or more modal segments and the collected viewer profile information; and providing a computer implemented display indicative of the determined optimal time and channel for delivery of the television advertising content.

Applicants have further developed an innovative computer implemented method of determining an optimal time and channel for delivery of television advertising content based on viewer profile information wherein the attention value is based on one or more indices selected from the group consisting of: a TV View Duration index, a Channel View Duration index, a Genre View Duration index, a Guide Interactions per Time index, and a DVR Interactions per Time index.

Applicants have still further developed an innovative computer implemented method of determining an optimal time and channel for delivery of television advertising content based on viewer profile information wherein the step of assigning the viewer to one or more modal segments is further based on determination of an exploration utility value for the viewer.

Applicants have still further developed an innovative computer implemented method of determining an optimal time and channel for delivery of television advertising content based on viewer profile information wherein the exploration utility value is based on one or more indices selected from the group consisting of: a Genre Familiarity index, a Program Familiarity index, a Channels Viewed index, a Genres Viewed index, and a Guide Interaction Duration index.

Applicants have still further developed an innovative computer implemented method of determining an optimal time and channel for delivery of television advertising content based on viewer profile information wherein the step of determining an optimal time and channel for delivery of television advertising content is further based on geographic data, wherein said geographic data comprises data selected from the group consisting of: climate, population density, ethnic population quantity, ethnic population distribution, race population quantity, race population distribution, income distribution, age distribution, gender quantity, gender distribution, and marital status distribution data.

Applicants have still further developed an innovative computer implemented method of determining an optimal time and channel for delivery of television advertising content based on viewer profile information further comprising the steps of: receiving spot information for a plurality of television spots; and receiving promoted program information for a plurality of television program promotions, wherein the step of determining the optimal time and channel for delivery of the television advertising content is further based on the spot information and the promoted program information, and comprises determining the optimal one of each of said plurality of television spots for delivery of each one of said plurality of television program promotions.

Applicants have still further developed an innovative computer implemented method of determining an optimal time and channel for delivery of television advertising content based on viewer profile information further comprising the steps of: determining the number of viewers assigned to the one or more modal segments in a geographic area; determining geographic data relating to the viewers in the one or more modal segments in the geographic area; and estimating with the computer a number of viewers to be associated with the one or more modal segments outside of the geographic area based on the number of viewers assigned to the one or more modal segments in the geographic area and the geographic data, wherein the step of determining an optimal time and channel for delivery of television advertising content is further based on the estimating of the number of viewers to be associated with the one or more modal segments outside of the geographic area.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

FIG. 15 is a print out of program data used to determine cross-network promotion program ranking in accordance with an embodiment of the present invention.

DETAILED DESCRIPTION OF EMBODIMENTS OF THE INVENTION

Figure 1:
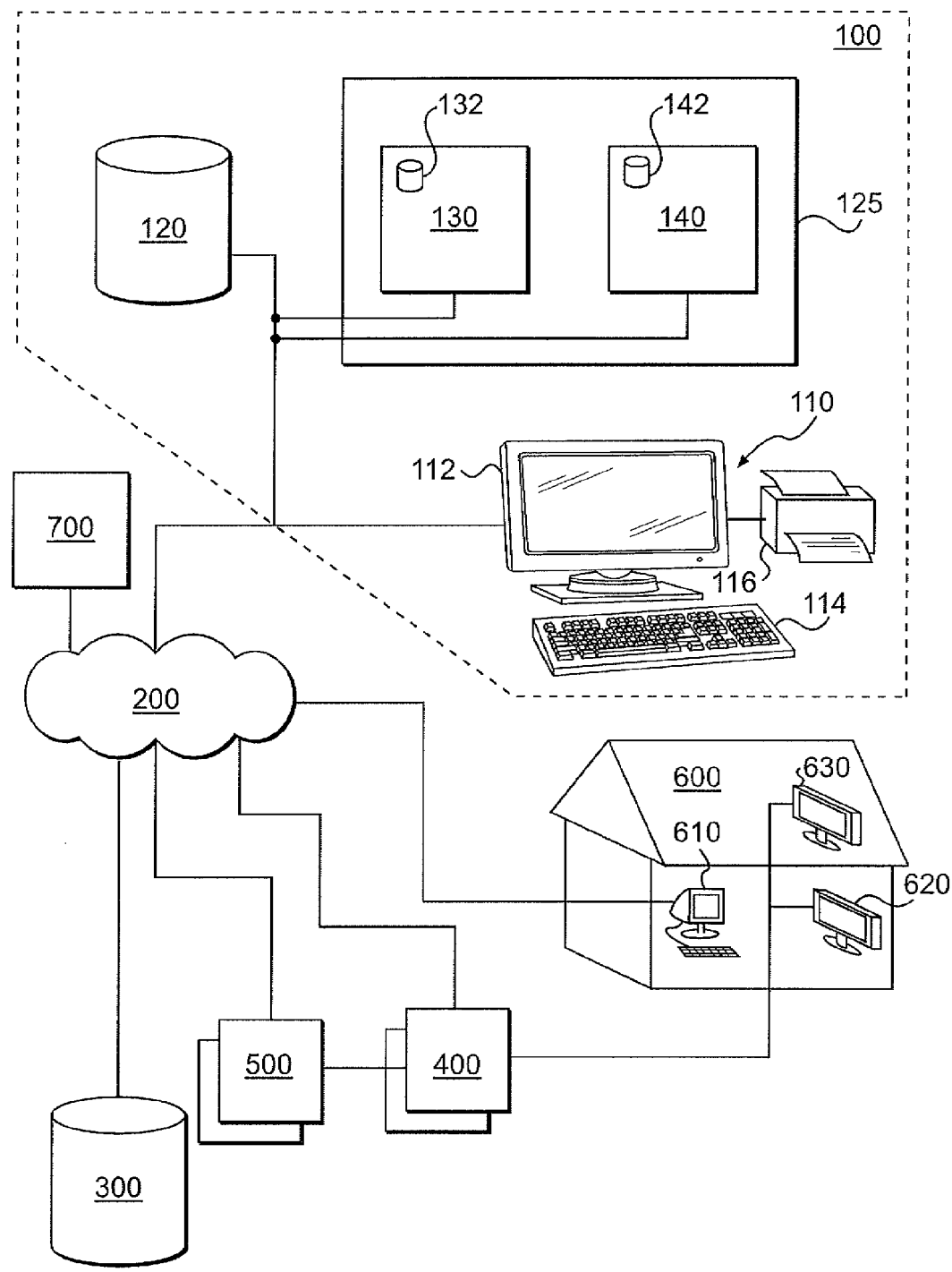
FIG. 1 is a schematic diagram of a television program promotion system that may be used to provide television program promotion in accordance with various embodiments of the present invention.

Reference will now be made in detail to a first embodiment of the present invention, an example of which is illustrated in the accompanying drawings. With reference to FIG. 1, a television (also referred to as "TV") promotion system 100 is provided. The TV promotion system 100 may include a user interface 110 having a video monitor 112, keyboard 114, and a printer 116. It is appreciated that multiple user interfaces 110 may be included in the TV promotion system 100, including multiple monitors 112, keyboards 114, and printers 116, as well as including other known computer-related hardware and software that permit a user to interface with a computer. Both wired and wireless computing devices for implementation of the TV promotion system 100 are within the intended scope of the present invention.

The user interface 110 (also referred to as "UI") may be connected via wired or wireless connection to a Data Warehouse (also referred to as "DW") database 120, and one or more computers (including processing and memory devices) 125 that collectively provide through hardware and/or software a Segmentation Engine 130 (also referred to as "SE") and an Inventory Manager 140 (also referred to as "IM"). The Segmentation Engine 130 may have a dedicated database 132 assigned to it and the Inventory Manager 140 may have a dedicated database 142 assigned to it. Alternatively, these databases may be part of the DW 120 and more particularly, may be provided as database tables within the DW 120.

The collective components of the TV promotion system 100 may be implemented as computer programs and associated database(s) and database tables which are run on, and provide storage for, general purpose computers having memory and/or processing capabilities. Furthermore, these components may be used to collect, transform, and apply data in such a way as to produce a tangible result, including, but not limited to: the creation of a viewable display of information indicating the proposed or actual airing of a promotion or advertisement at a specified time on a specified television channel; a viewable display of information indicating the optimal ranking of proposed airing of promotions or advertisements at a specified time on a specified television channel; visually perceptible reporting of the airing of a promotion or advertisement; visually perceptible reporting of financial information related to the airing of a promotion or advertisement; visually perceptible reporting of the data stored for use by the TV promotion system; delivery of a promotion or advertisement to a viewer's set top box; and display of the promotion or advertisement on a viewer's television.

The TV promotion system 100 may also be connected via a wired or wireless connection to a communications network 200. The communications network 200 is intended to represent all networks that are necessary to provide the communication between the devices shown in FIG. 1. Accordingly, it is appreciated that the communications network 200 may constitute multiple networks, which may or may not be interconnected and which may use diverse communications protocols and network infrastructure. For example, and without limitation, the communications networks 200 may include one or more cable, fiber optic, satellite, microwave, and wireless networks which are capable of delivering video, audio, digital, and/or other data between the devices connected to the network 200.

The communications network 200 may be connected to one or more third party databases 300 which store one or more of: viewer profile information, television advertising content attributes, television program attributes, geographic data, and viewer historical data. To the extent stored on the one or more third party databases 300, the viewer profile information, television advertising content attributes, television program attributes, geographic data, and viewer historical data may be periodically retrieved by the TV promotion system 100 and stored in the DW 120.

The communications network 200 may also be connected to one or more TV service providers 400, which include without limitation, digital or analog broadcasters, digital video recorder (DVR) service providers, satellite TV service providers, cable TV operators (CO), and fiber optic TV service providers. The one or more TV service providers 400, in turn, may be connected to one or more TV content providers 500, such as, but not limited to, any one of the number of cable TV networks (CN) and satellite TV networks. The TV service providers 400 may obtain TV content, including TV advertising content, from the TV content providers 500 for delivery to a viewer household 600. The TV content providers 500 may also be connected to the telecommunications network 200. An alternative source of TV advertising content 700, such as an advertising agency, may also be connected to the telecommunications network 200.

The viewer household 600 may include a telecommunications device, such as a home computer 610 which may be used in alternative embodiments to collect viewer information and/or viewer household information, and provide such information to the DW 120. The viewer household 600 may contain multiple TVs 620 and 630. The TVs 620 and 630 may include one or more of a video display, a set top box (STB), a remote control unit, and a DVR. The TVs 620 and 630 may be connected to a TV service provider 400 through, for example, a co-axial cable, fiber optic, or satellite connection.

As a volume storage medium, DW 120 may be a central or distributed repository of data useful to functions of other TV promotion system 100 functional components, including the SE 130 and the IM 140. DW 120 may host data describing viewer's attention allocation decisions, i.e., viewer profile information, among other data. The viewer profile data may be obtained from any source, but is most likely obtained from the one or more TV service providers 400 or the third party database 300. A "viewer," "person" and "people" as referred to herein may indicate actual identified or anonymous individuals or groups of individuals, individual set top box(es) (i.e., "STB") (or the equivalent of set top boxes) in a household or other television consuming unit, and/or the collective group of set top box(es) in a household or television consuming unit.

Examples of viewer profile information (also referred to as attention allocation information), include, but are not necessarily limited to indications of: content type of a television program, amount of time spent watching a television channel, amount (i.e., volume) of time spent watching a television program or programming type, title of the television program, amount of time spent watching television programming of a particular content type, percentage share of overall viewing time spent watching one or more television channels, percentage share of overall viewing time spent watching one or more television programs, percentage share of overall viewing time spent watching television programming of a particular content type or different content types, a mode of content consumption, duration of viewing on a channel, number of channels viewed, degree of similarity between television programming viewed during a recent period and that viewed during a historical period, wherein said historical period includes time before said recent period, frequency with which the viewer changes television channels, actual display by a television of a particular television program, viewer interaction with a digital video recorder including details of such interaction, viewer interaction with an electronic programming guide including details of such interaction, viewer interaction with a video-on-demand (VOD) service including details of such interaction, and keywords provided by the viewer or by an expert system.

With regard to the foregoing viewer profile information, content type of a television program may be indicated by a content genre, such as for example, news, sports, action, drama, science fiction, late night, horror, movie, situation comedy, etc. Program genre may have far more detail and be hierarchically related to the fundamental genre referenced herein. For example, Sports may include Sports/Football, which in turn may include Sports/Football/NFL, etc. Furthermore, the use of "genre" in this application may include descriptors outside of the limited use of "genre" in the television arts. For example, genre may include alternative descriptors such as black and white v. color, time periods (e.g., 1970's), geographic divisions (e.g., British TV), etc.; production details (e.g. Director, Writer, Producers, Release or Original Air Date, Actors, Contestants, Music Composer, Runtime, Country, Rating, Language, Filming Location, etc.); and user generated or Expert System supplied Key words or Tags applied to Program, Plot or Genre.

Details of viewer interaction with a DVR may include interactions such as recording, pausing, replaying, fast forwarding, and fast reversing, for example. Further, details of viewer interaction with an electronic programming guide may include interaction details such as duration of interaction, time and date of interaction, program detail information selected for review, and frequency of viewer interaction. And, details of viewer interaction with a VOD may include interactions such as duration of viewer interaction with the VOD service, time and date details of viewer interaction with the VOD service, and frequency of viewer interaction with the VOD service.

The viewer profile information may further include viewer attribute data, which includes, but is not necessarily limited to indications of viewer or viewer household: income, employment, race, ethnicity, age, gender, marital status, parental status, children in household, number of people in household, number of televisions, and television subscription data.

DW 120 may also host geographic data and viewer historical data. Examples of geographic data, may include, but are not necessarily limited to: climate, population density, ethnic population quantity, ethnic population distribution, race population quantity, race population distribution, income distribution, age distribution, gender quantity, gender distribution, and marital status distribution data for the geographic region in which the viewer or viewer household are located. Examples of viewer historical data, include, but are not necessarily limited to the same types of information as included in viewer profile information, but for a period of time that predates the period to which current viewer profile information pertains. Accordingly, viewer historical data and current viewer profile information may be subsets of viewer profile information as a whole.

The DW 120 preferably may exclude data that constitutes personally identifiable information. Examples of personally identifiable information may include: full name, national identification number, telephone number, street address, e-mail address, IP address, vehicle registration number, driver's license number, face image, fingerprints, or handwriting information, credit card numbers, and digital identity.

Equipped with computer processing capacity, the DW 120 may also schedule and execute scripts to retrieve data from the TV promotion system's 100 partners (e.g., which may include data providers compensated for the provision of data by also utilizing the system as a client or customer, or by direct payment). The TV promotion system 100 may utilize a set of extraction, transformation and loading (ETL) processes that insert the data into the table structures in the repository. The DW 120 may constitute one or more databases, and/or one or more data tables within a database. ETL processes may be used to locate useful data and convert it as necessary into a form that is useful to the TV promotion system 100 and capable of being stored in the DW 120. The ETL processes may convert such data so that it is in a completely uniform or more uniform for use across the TV promotion system 100. The DW 120 may interact with the UI 110 to support administrative functions governing script schedules and to publish alert messages associated with exceptions in script execution.

The SE 130 may utilize computer processing capacity to interface with the DW 120 to analyze viewer profile information and to assign viewers to audience segments according to their content preferences (i.e., Content Preference segments), and/or their mode of content consumption (i.e., Modal Segments). Other segmentation groups based on the viewer profile information and/or geographic data may be utilized in alternative embodiments.

Content Preference Segmentation may organize (i.e., segment) viewers into groups according to the types of content they consume and the volume (e.g., number of minutes per unit of time) and share (e.g., percentage of overall viewing time) of their attention dedicated to types of content. The "type of content" may be synonymous with program "genre" as described above, or may be a descriptor of such content which is only tangentially related or completely unrelated to genre.

Modal Segmentation may be used to organize viewers into groups according to the manner in which they consume content, and more particularly, the value of viewing time to a viewer, and the allocation of that viewing time. A viewer may be assigned to a different Modal Segment at different points in time depending on whether he or she is determined to be seeking comfort in (typically by viewing) the most familiar content, actively engaged in identifying and potentially viewing new types of content, or a combination of the foregoing. Assignment to Modal Segments may be impacted by the time and frequency of a viewer's viewing and searching habits in connection with different types of content, including but not limited to VOD and non-VOD programming consumption, and/or electronic programming guide use in the near and long term.

The SE 130 may execute statistical algorithms in order to determine segment membership for those viewers for which the DW 120 has data, whether based on direct observation or third party reporting, and to project segment membership distribution on populations for which the DW 120 has no data based on direct observation.

To assign a person to a Content Preference Segment, the SE 130 may retrieve the definition of the Content Preference Segment, a threshold volume and share of different types of content consumed that are established through classification and clustering techniques of the type used by those of ordinary skill in the art of statistics, retrieve records of viewers' television viewing in a specified time period, analyze the nature of the content the viewers have consumed, and compare the volumes and shares of different types of content consumed to the segment definition's threshold volume and share values. When a viewer's volume and share of different types of content consumed meets the threshold volume and share prescribed by the Content Preference Segment definition, the person is assigned to the segment.

To assign an individual to a Modal Segment, the SE 130 may retrieve the definition of the Modal Segment, threshold values for, example, duration of content consumption, duration of content consumption on a single channel, number of channels viewed, and the degree of similarity of recent content consumption in comparison to historical content consumption (i.e., how close a viewer's recent viewing consumption matches that over a longer historical period). Modal Segment definition thresholds may be established through classification and clustering techniques. The SE 130 may also retrieve records of a viewer's television viewing in a specified time period, analyze how the viewers have consumed content, and compare the values representing how content is consumed to the segment definition's thresholds. When a viewer's values representing the manner in which content was consumed meet the threshold values prescribed by the segment definition, the viewer may be assigned to one or more Modal Segments.

The IM 140 may utilize computer processing capacity to interface with the DW 120 and the SE 130, to optimize the allocation of TV service provider 400 and/or TV content provider 500 promotional spot inventory with respect to increasing and preferably optimizing programming tune-in and video-on-demand activation for a set of promoted programs, and update matrices hosting the optimized promotional insertion for each spot in inventory and the data supporting that assignment of promotion to a spot where a "spot" is a pre-ordained time period for insertion of an advertisement, preferably a cross-network program promotion advertisement. For example, there may be four 30 second duration spots in a Pod (i.e., commercial break) and there may be three (3) Pods per 30 minutes of programming.

The IM 140 may select the spots which will improve or optimize programming tune-in and video-on-demand activation for the entire portfolio of available promoted programs that are in circulation at any point in time. If a spot has the same value to more than one advertisement or promotion then the selection of an advertisement or promotion to insert into the spot may based on the following criteria arranged in order of importance: time until promoted program airs or, in the case of VOD, time until the program expires (where the promotion for the program to air or expire soonest has priority); business impact (e.g., the promotion for the program owned by the partner with greatest contractual obligations to improve ratings or to provide additional services in response to performance shortcoming has priority); financial gain/cost to one or more of the involved parties including the operator of the TV promotion system 100, a cable operator, a cable network provider, etc.; and/or random allocation.

Figure 14:
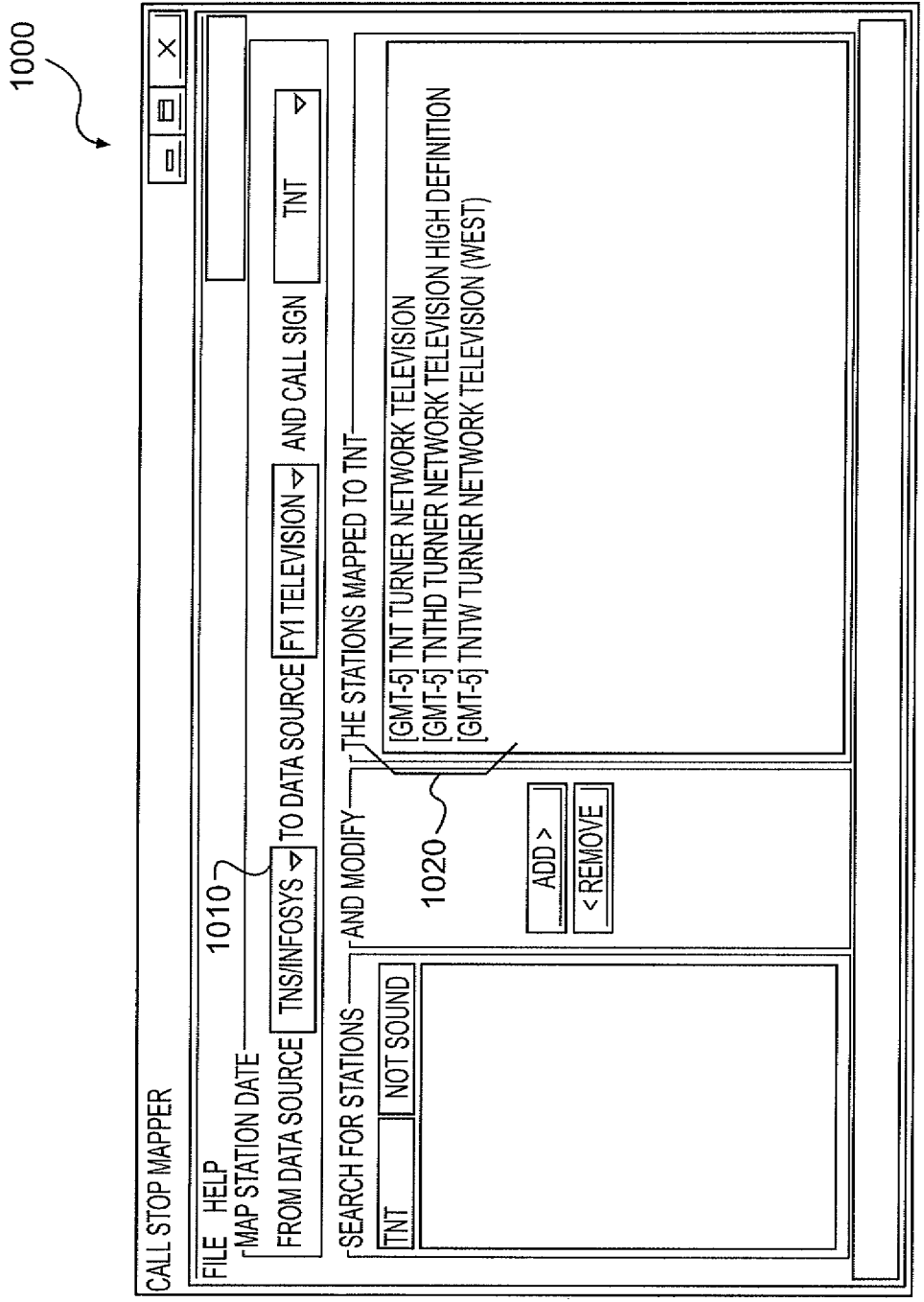
FIG. 14 is an illustration of a computer screen showing a call sign mapper utility user interface window used for data management in accordance with an embodiment of the present invention.

The UI 110 may utilize computer processing capacity to provide a presentation layer to authenticated users of the TV promotion system 100 for the purposes of inserting select data into the DW 120, executing exception processes to resolve issues in the DW (e.g. connectivity failures in data file retrieval, data format inconsistencies with specification, and insufficient disk space allocated to files), SE 130 and IM 140 application workflows and querying SE and IM application data output. An illustration of a computer screen 1000 showing a call sign mapper utility which is used to map data associated with a particular data source to potentially multiple television channels is shown in FIG. 14. In the example shown in FIG. 14, the data identified in field 1010, which is labeled "TNS/Info Sys" is mapped to multiple affiliated TNT channels identified in field 1020 in the DW 120.

The UI 110 may support administration of user accounts, including the specification of user roles, and provide access to documents and interface functionality based on credentials supplied by users. For example, in a preferred embodiment, only users with administrative access credentials may access the UI 110 functionality to create new user accounts.

The following workflow functions, illustrated by FIGS. 2-10, may be carried out by the TV promotion system 100 in accordance with an embodiment of the present invention. It is understood that not all functions may be required in alternative embodiments of the invention, and that still further alternative embodiments may include additional functions.

Figure 2:
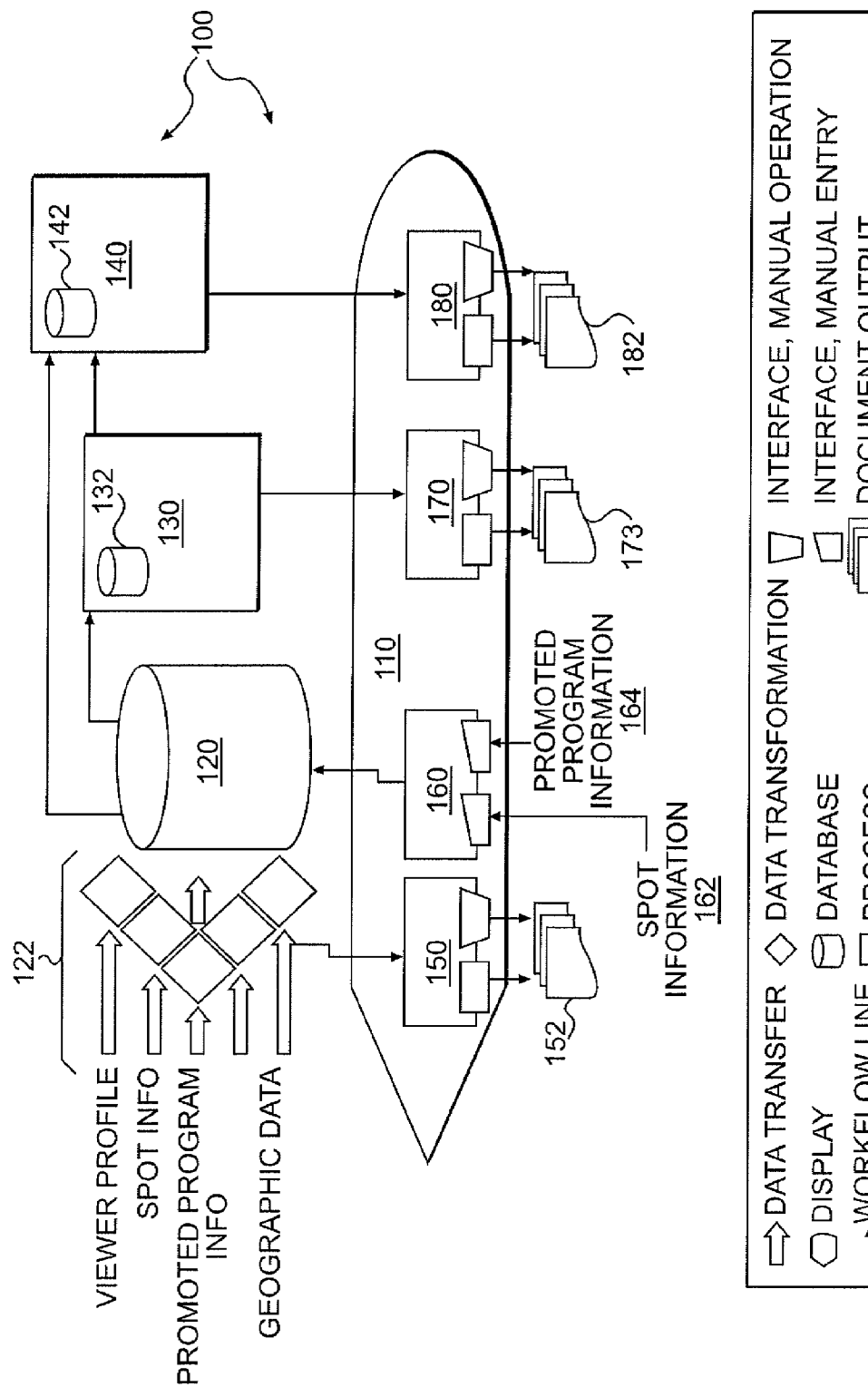
FIG. 2 is a schematic diagram of a portion of the system shown in FIG. 1, which indicates information flow between elements of the system in accordance with an embodiment of the present invention.
Figure 3:
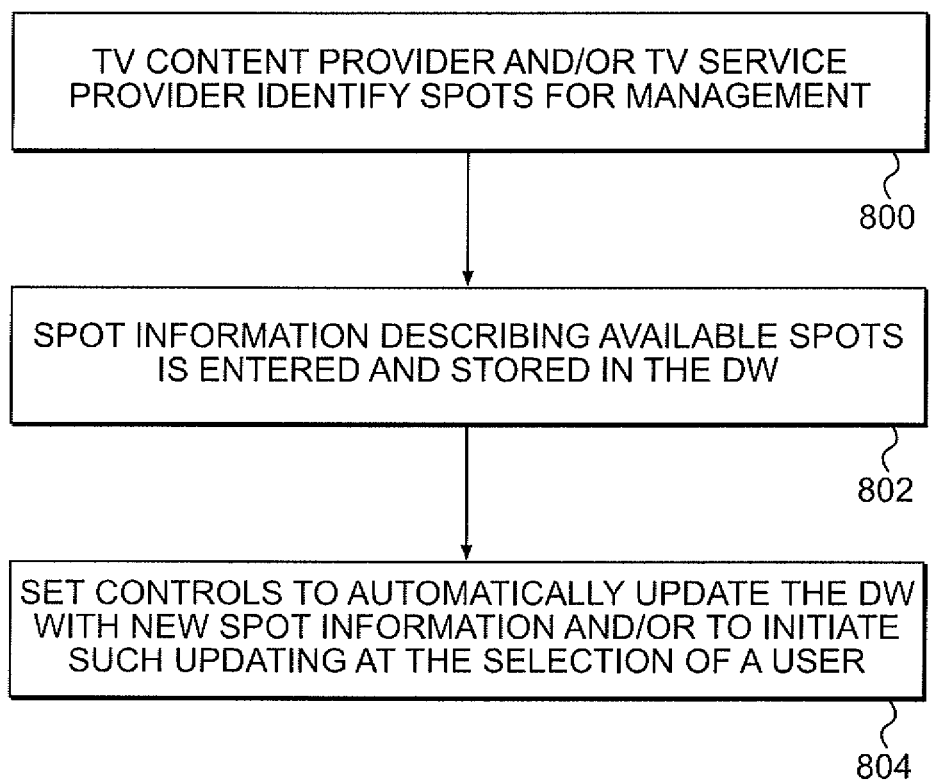
FIG. 3 is a flow chart which illustrates the steps of a computer-implemented method of acquiring spots in accordance with an embodiment of the present invention.

With reference to FIGS. 1-3, in step 800 of FIG. 3, both or either of a TV content provider 500 and a TV service provider 400 may identify one or more spots for management by the TV promotion system 100. In step 802, information describing available spots may be provided to the DW 120 of the TV promotion system 100 by the computer-implemented transmission of spot information 162 (FIG. 2) from the TV content provider 500 and/or the TV service provider 400 over the telecommunications network 200 via a data insertion process 160. Alternatively, spot information may be provided to the TV promotion system 100 by an operator manually entering and storing the spot information 162 in the DW 120 using the UI 110 for data insertion process 160.

Examples of the spot information 162 which may be used to describe the spots include, without limitation: spot owner, indication of national or local spot, network affiliation, channel affiliation, carrier program affiliation, date, time of day, Pod number, Pod position, geographic, expected reach, actual reach, and rules governing use information.

Actual reach information may indicate the reported number of viewers for a spot, and expected reach information may indicate the number of viewers predicted to view a spot. Pod number and position may indicate the time in a program that a set of spots will air. For example, a Pod may constitute four 30 second long messages/promotions, and there may be three Pods spaced a number of minutes apart in a 30 minute long program. In step 804, the UI 110 may be used to set computer-implemented controls to automatically update the spot information 162 in the DW 120 and/or to initiate such updating at the selection of a user.

Figure 4:
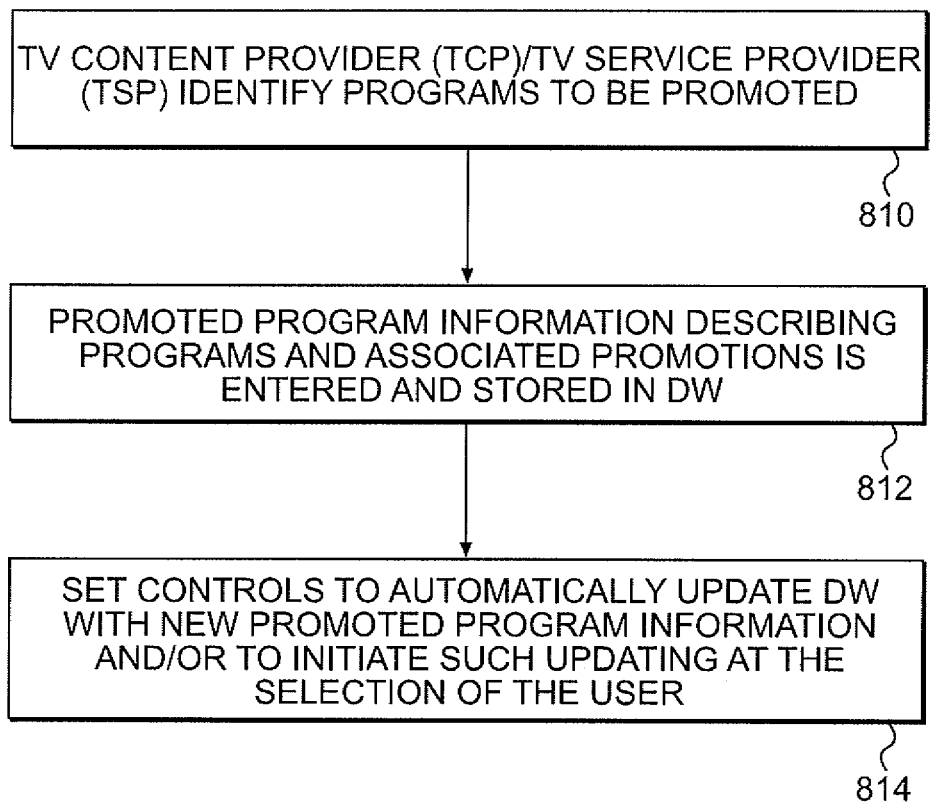
FIG. 4 is a flow chart which illustrates the steps of a computer-implemented method of acquiring programs to be promoted in accordance with an embodiment of the present invention.

With reference to FIGS. 1-2 and 4, in step 810 of FIG. 4, both or one of the TV content provider 500 and the TV service provider 400 may identify one or more TV programs to be promoted by the TV promotion system 100. In step 812, information describing the programs to be promoted may be provided to the DW 120 of the TV promotion system 100 by the computer-implemented transmission of promoted program information 164 (FIG. 2) from the TV content provider 500 and/or the TV service provider 400 over the telecommunications network 200 via a data insertion process 160. Alternatively, promoted program information 164 may be provided to the TV promotion system 100 by an operator manually entering and storing the promoted program information 164 in the DW 120 using the UI 110.

Examples of the promoted program information 164 that relate to promotions include, without limitation: promotion name, owner, promoted program name, program type, Appointment/VOD, duration, and promoted program air data information. Appointment/VOD may indicate the time of day at which a program airs or the time of day that a VOD program is viewed. Examples of the promoted program information 164 that relate to programs include, without limitation: program name, distribution rights holder, program air date, VOD availability start date, VOD availability end date, genre, and production details information. Promoted program information may also include business impact information and financial information, where financial information may include information indicative of cost for delivery of a television program promotion to an audience segment and/or information indicative of revenue generated for delivery of a television program promotion to the audience segment.

In step 814, the UI 110 may be used to set computer-implemented controls to automatically update the promoted program information 164 in the DW 120 and/or to initiate such updating at the selection of a user.

Figure 5:
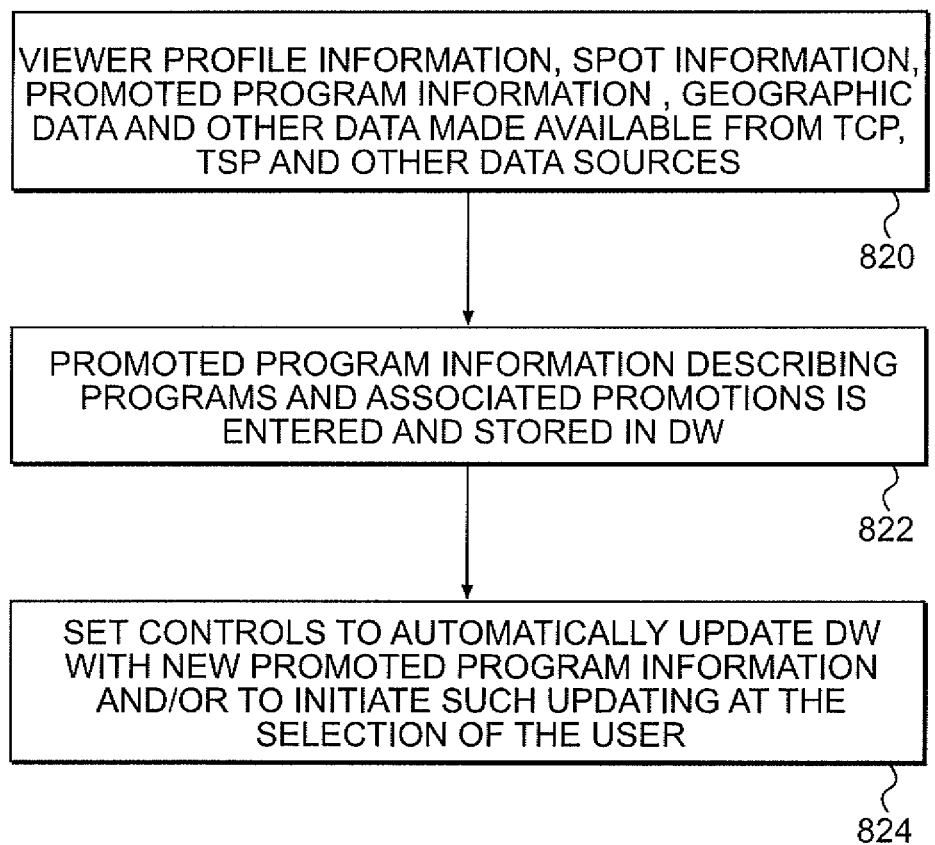
FIG. 5 is a flow chart which illustrates the steps of a computer-implemented method of processing data collected to carry out an embodiment of the present invention.

With reference to FIGS. 1-2 and 5, in step 820 of FIG. 5, the TV content provider 500 and/or the TV service provider 400 may make viewer profile information, spot information, promoted program information, and geographic data, and/or other data available to the TV promotion system 100 via a computer-implemented data transmission over the telecommunications network 200. The viewer profile information may be provided by the TV service providers 400. The spot information and promoted program information may be provided by the TV content providers 500 and advertising content providers 700. The geographic data may be obtained from third party data sources 300. In step 822, the DW 120 may automatically retrieve the viewer profile information, spot information, promoted program information, and geographic data, and/or other data via a computer-implemented and automated routine that is carried out on a periodic basis and copy it to locations accessible in database tables/databases which are part of the DW for extraction, transformation and loading (ETL) process 122 (FIG. 2). In step 824, the DW 120 may execute extraction, transformation and loading processes to update the database tables/databases which are accessed by the SE 130 and/or IM 140.

Figure 6:
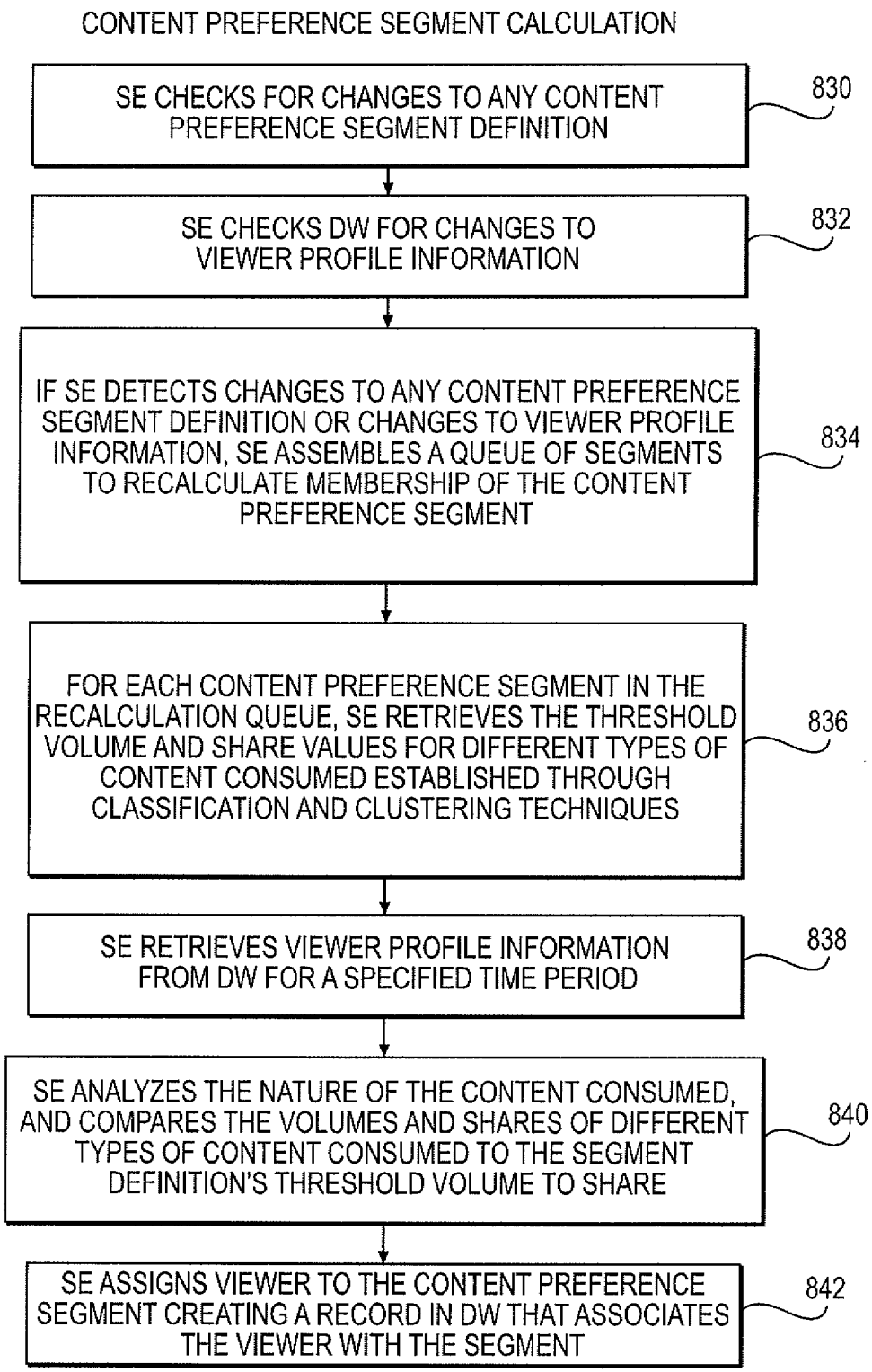
FIG. 6 is a flow chart which illustrates the steps of a computer-implemented method of content preference segment calculation in accordance with an embodiment of the present invention.

With reference to FIGS. 1-2 and 6, in step 830 of FIG. 6, the SE 130 may check for changes to any Content Preference Segment definition stored in the DW 120 or other memory associated with the computer 125. The Content Preference Segment definitions may be defined by one or more threshold values which are automatically or manually set and which indicate the minimum values or range of values for inclusion of a viewer in a Content Preference Segment. A "segment" may be defined as a group of viewers who have attribute values that meet a minimum threshold value or are within a common range of values such that the viewers are considered to be like and in the same group or segment. The referenced threshold values or range of values for a Content Preference Segment may relate to any of the categories of viewer profile information which relate to the type and/or amount of television content consumed by a viewer.

In a preferred embodiment, the Content Preference Segments may be defined by threshold volumes and/or shares of consumption of one or more of: a particular genre or genres per unit of time, a particular channel or channels per unit of time, and a particular television program or programs per unit of time. The unit of time used may be any that is appropriate, including, for example, a day, week, or month. For example, a viewer may be assigned to a Sports Content Preference Segment if the viewer consumes five or more hours of television programming in the Sports genre per week, or if thirty or more percent the viewer's television programming consumption per month is in the Sports genre. In another example, a viewer may be assigned to a Sports Content Preference Segment if the viewer consumes five or more hours of television programming from the ESPN channel in a week.

In step 832 of FIG. 6, the SE 130 may check the DW 120 for changes to the viewer profile information that relates to the type and/or amount of television content consumed by a viewer. This viewer profile information may be used to determine whether or not the viewer still satisfies the requirements for inclusion in a Content Preference Segment (i.e., whether the data values associated with the viewer meet the thresholds for the segment).

In step 834, if the SE 130 detects changes to any Content Preference Segment definition or changes in the viewer profile information, the SE may assemble a queue of Content Preference Segments to recalculate membership of the segments.

In step 836, for each Content Preference Segment in the recalculation queue, the SE 130 may retrieve the threshold volume and/or share values for different types and/or amounts of television programming content consumed by the viewers that are established through classification and clustering techniques.

In one embodiment of the present invention, specially trained resources (users) may assign values in the TV promotion system 100 to programs based on knowledge of the programs' attributes for classification of the programs. The resources may then curate a subset of programs with like value assignments and instruct the computer-implemented TV promotion system 100 to identify the set-top boxes that are observed to tune in to that subset of programs (the clustering). In another embodiment of the present invention, algorithms, such as a k-means algorithm, may be used to cluster programs based on a set of pre-defined characteristics such as hour of airing, network, cast, genre, and others. In still another embodiment of the present invention, the TV promotion system 100 may cluster programs using a logistic regression classifier in which each available STB is assigned probability of tune in to a promoted program based on whether it was tuned in to a similar program in the past. For example, the STBs with an associated probability p>0.5 may form a "likely to tune in" cluster. Still further, it is appreciated that the segmentation resulting from this step may utilize a different binary classifier method, for example support vector machines (SVM).

In step 838, for each Content Preference Segment in the recalculation queue, the SE 130 may retrieve the viewer profile information for a specified time period. The viewer profile information required may include, in particular, the information which identifies the nature and content of the television programs watched by the viewers such as content type of a TV program, amount and/or percentage share of time spent watching television programming of a particular content type, amount and/or percentage share of viewing time spent watching one or more television channels, and amount and/or percentage share of viewing time spent watching one or more television programs. In step 840, the SE 130 may compare the volumes and shares of different types of content consumed by the viewers (i.e., the viewer profile information) with the Content Preference Segment's definitional threshold volume and share. In step 842, the SE 130 may assign each viewer to one or more Content Preference Segments based on such comparison and record the assignment in the DW 120 thereby associating the viewer with the segments. The SE may also compare the strength of a viewer's association with more than one Content Preference Segment to determine which one Content Preference Segment is most appropriate for the viewer, if limitation to one or a limited number of Content Preference Segments is desired.

Figure 7:
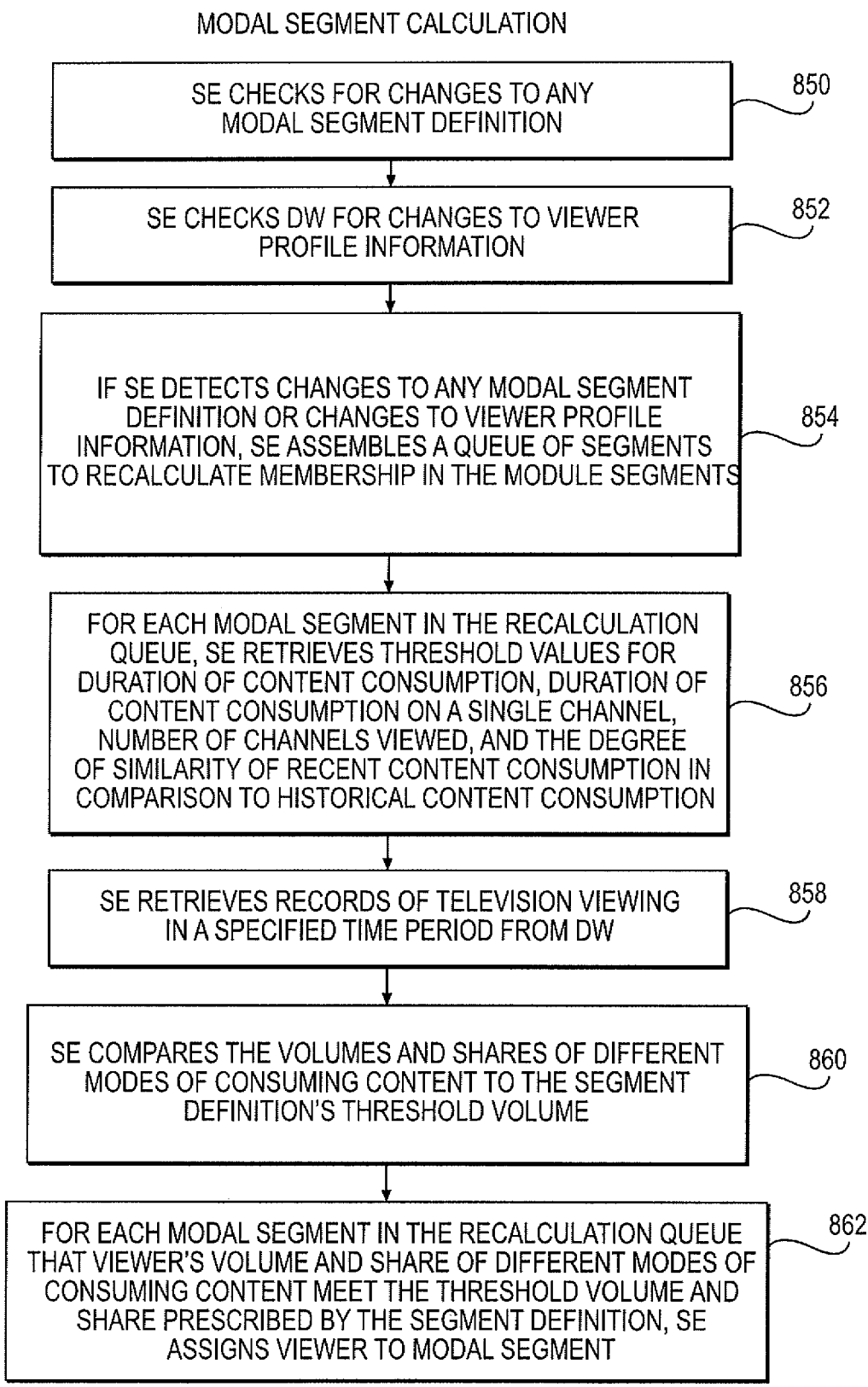
FIG. 7 is a flow chart which illustrates the steps of a computer-implemented method of modal segment calculation in accordance with an embodiment of the present invention.

With reference to FIGS. 1-2 and 7, in step 850 of FIG. 7, the SE 130 may check for changes to any Modal Segment definition stored in the DW 120 or other memory associated with the computer 125. The Modal Segment definitions may be defined by one or more threshold values which are automatically or manually set and which indicate the minimum values or range of values for inclusion of a viewer in a Modal Segment. The referenced threshold values or range of values may relate to any of the categories of viewer profile information which indicate the mode (i.e., manner) of television programming consumption by a viewer.

Figure 11:
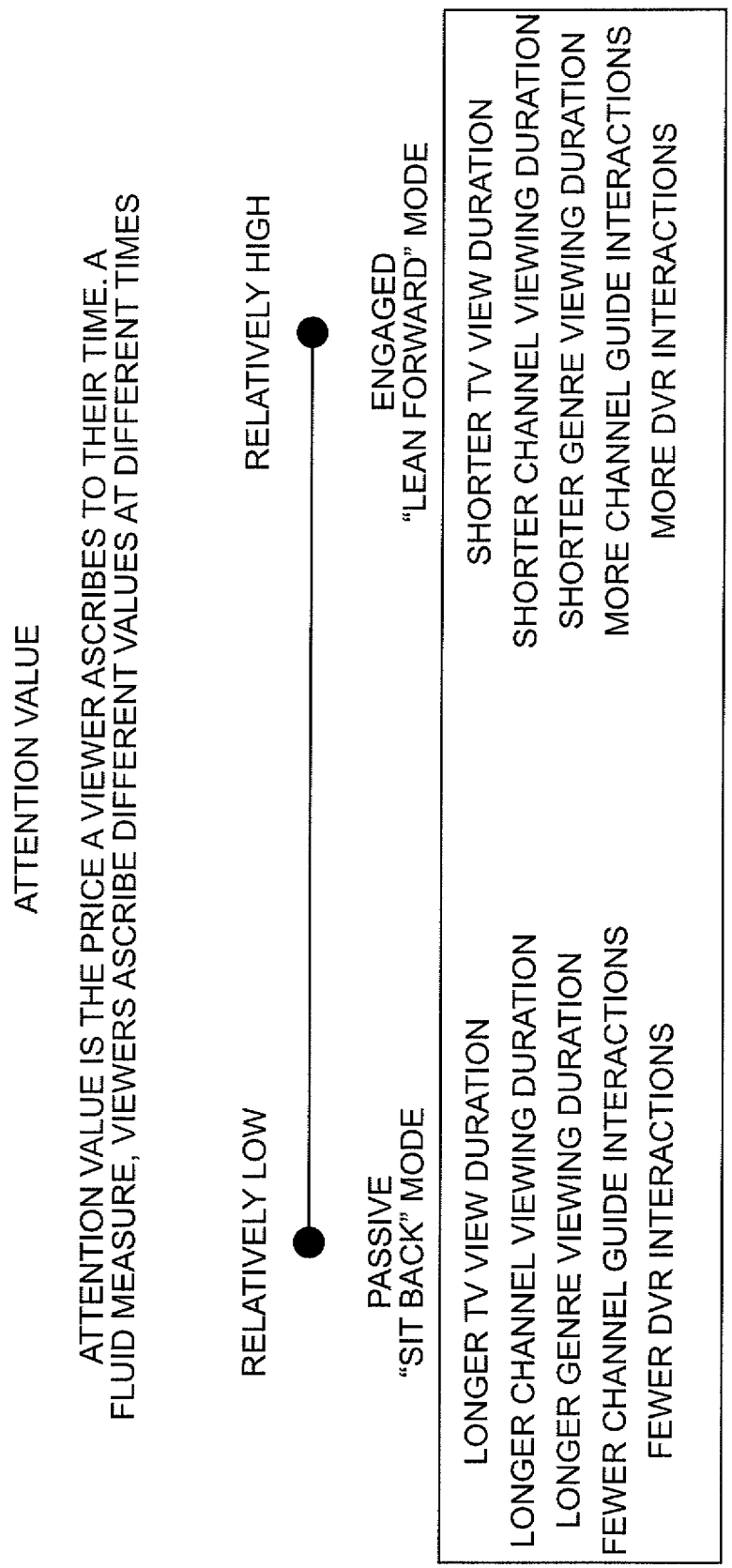
FIG. 11 is a diagram of an Attention Value scale that may be used to determine viewer membership in one or more modal segments in accordance with an embodiment of the present invention.

In a preferred embodiment, the values that may be considered for Modal Segment definition may be grouped into Attention Values and Exploration Utility Values. With reference to FIG. 11, an Attention Value may be representative of the value a viewer ascribes to her viewing time. It is appreciated that the Attention Value may differ during different parts of the day, week, or month, for example. As illustrated in FIG. 11, Attention Values may fall within a range extending generally from "passive" viewers to "engaged" viewers. Passive viewers may tend to have relatively longer television, channel and genre viewing durations, and relatively fewer channel guide and DVR (including "on-demand" service) interactions. Conversely, engaged viewers may tend to have relatively shorter television, channel and genre viewing durations, and relatively more channel guide and DVR (including "on-demand" service) interactions.

The following Table 1 provides examples of Attention Values, and particular Attention Value Indices, that may be calculated in determining Modal Segments.

TABLE 1

| | INDEX | CALCULATION |
|---|---|---|
| Attention Value | TV View Duration | Average Daily TV Viewing Time/ Daily Viewing Time on Day D |
| | Channel View Duration | Average Daily Time Spent Viewing Channel C/Duration Spent Viewing Channel C on Day D |

TABLE 1-continued

| INDEX | CALCULATION |
|---|---|
| Genre View Duration | Average Daily Time Spent Viewing Genre G/Duration Spent Viewing Genre G on Day D |
| Guide Interactions/ Time | Average Daily Count of Guide Interactions/Count of Guide Interactions on Day D |
| DVR Interactions/ Time | Average Daily Count of DVR Interactions/Count of Guide Interactions on Day D |

Each of the indices identified in Table 1 may be determined for individual viewers and then combined for all viewers in a segment or geographical area.

Figure 12:
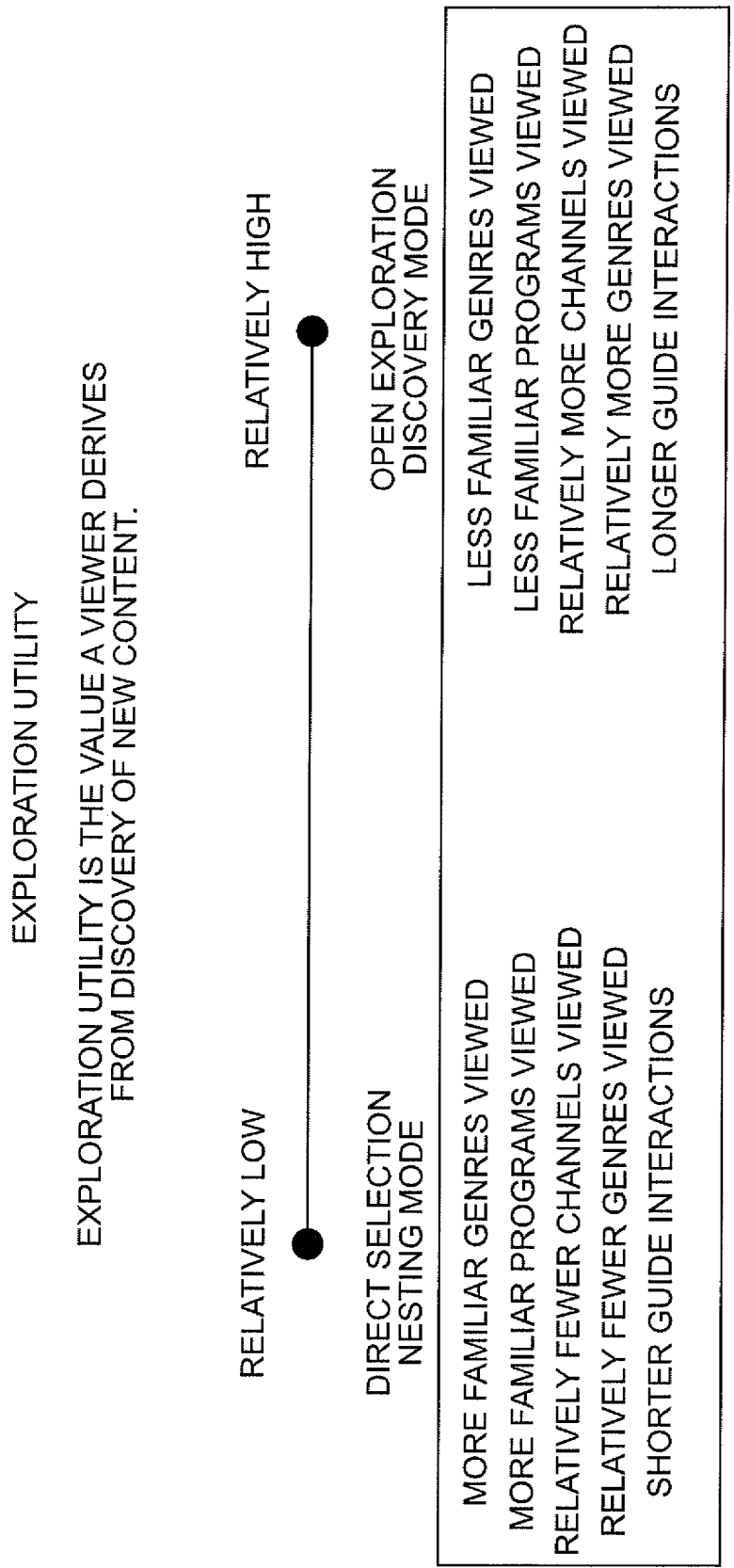
FIG. 12 is a diagram of an Exploration Utility Value scale that may be used to determine viewer membership in one or more modal segments in accordance with an embodiment of the present invention.

With reference to FIG. 12, an Exploration Utility Value may be representative of the value a viewer derives from discovery of new content. It is appreciated that the Exploration Utility Values may differ during different parts of the day, week, or month, for example. As illustrated in FIG. 12, Exploration Utility Values may fall within a range extending generally from "directed selection" viewers to "open exploration" viewers. Directed selection viewers may tend to view the same (i.e., more familiar) genres, channels and programs, and view a relatively fewer number of channels and genres, and have relatively shorter channel guide interactions. Conversely, open exploration viewers may tend to view the different (i.e., less familiar) genres, channels and programs, and view a relatively greater number of channels and genres, and have relatively longer channel guide interactions.

The following Table 2 provides examples of Exploration Utility Values, and particular Exploration Utility Indices, that may be calculated in determining Modal Segments. Each of the indices identified in Table 2 may be determined for individual viewers and then combined for all viewers in a segment or geographical area.

TABLE 2

| | INDEX | CALCULATION |
|---|---|---|
| Exploration Utility | Genre Familiarity | Probability of Viewing Genre G on Day D based on historical allocation of share of attention to Genre G |
| | Program Familiarity | Probability of Viewing Program P on Day D based on historical allocation of share of attention to Program P |
| | Channels Viewed | Average Daily Number of Channels Viewed/Number of Channels Viewed on Day D |
| | Genres Viewed | Average Daily Number of Genres Viewed/Number of Genres Viewed on Day D |
| | Guide Interaction Duration | Average Daily Time spent with Guide/Time with Guide on Day D |

With renewed reference to FIG. 7, the definition of a Modal Segment may be revised as a result of periodic "segment maintenance." The segment definitions may be reconsidered in light of one or more of the Attention Value and Exploration Utility Value indices. In particular, the TV View Duration index from the Attention Value Indices, and the Channels Viewed and Genres Viewed indices may be evaluated in order to determine if changes should be made to the definition of a segment. Additionally, the following indices listed in Table 3 may be considered in determining whether to make changes to the segment definitions. The indices in Table 3 may be determined for entire segments of viewers.

TABLE 3

| INDEX | | CALCULATION |
|---|---|---|
| Segment Maintenance | Share of Attention | Segment Time Viewing Genre/Segment Time Viewing TV |
| | Amount of Attention | Segment Time Viewing Genre |
| | Genre Share | (Segment Time Viewing Genre/Segment Time Viewing TV)/(Total Population Time Viewing Genre/Total Population Time Viewing TV) |

Figure 13:
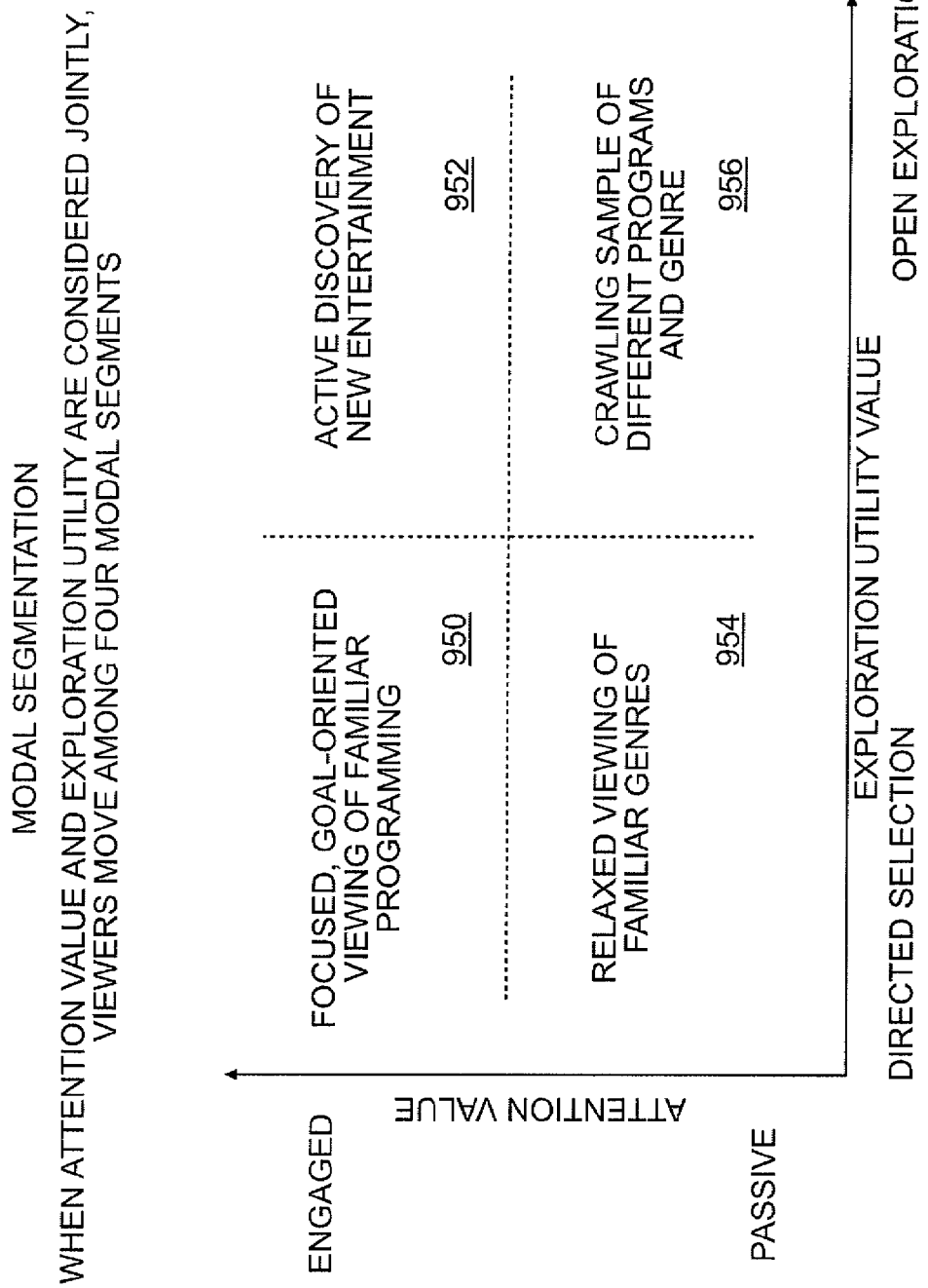
FIG. 13 is a diagram illustrating an example of modal segment definitions in accordance with an embodiment of the present invention.

FIG. 13 illustrates four example Modal Segments that viewers may be placed into based on computer implemented comparisons of a combination of Attention Values and Exploration Utility Values for viewers with threshold values. The combination of one or more Attention Value indices and one or more Exploration Utility Value indices may cause a viewer to be assigned to one of the four Modal Segments 950, 952, 954 or 956. It is appreciated that more or less than four Modal Segments may make up the full range of available Modal Segments in which a viewer may be assigned and that a viewer may be assigned to more than one Modal Segment for a particular time of the day, week, month, etc.

With renewed reference to FIGS. 1, 2 and 7, in step 852 of FIG. 7, the SE 130 may check the DW 120 for changes to viewer profile information that relate to the mode of television programming consumption by a viewer. Changes to the viewer profile information may be used to determine whether or not the viewer still satisfies the requirements for inclusion in a Modal Segment (i.e., whether the data values associated with the viewer meet the thresholds for the segment).

In step 854, if the SE 130 detects changes to any Modal Segment definition or changes in the viewer profile information relating to the mode of television programming consumption, the SE may assemble a queue of Modal Segments to recalculate membership of the segments.

In step 856, for each Modal Segment in the recalculation queue, the SE 130 may retrieve the threshold volume and/or share values for different modes of television programming consumed by the viewers that are established through classification and clustering techniques.

In step 858, for each Modal Segment in the recalculation queue, the SE 130 may retrieve the viewer profile information relating to the mode of television programming consumption for a specified time period. The viewer profile information required may include, in particular, the information which indicates a mode of television consumption, such as shown in the charts above and illustrated in FIGS. 11 and 12. In step 860, the SE 130 may compare the volumes and shares of different modes of consuming content by the viewers (i.e., the viewer profile information) with the Modal Segment's definitional threshold volume. In step 862, the SE 130 may assign each viewer to one or more Modal Segments based on such comparison and record the assignment in the DW 120 thereby associating the viewer with the segments.

Figure 8:
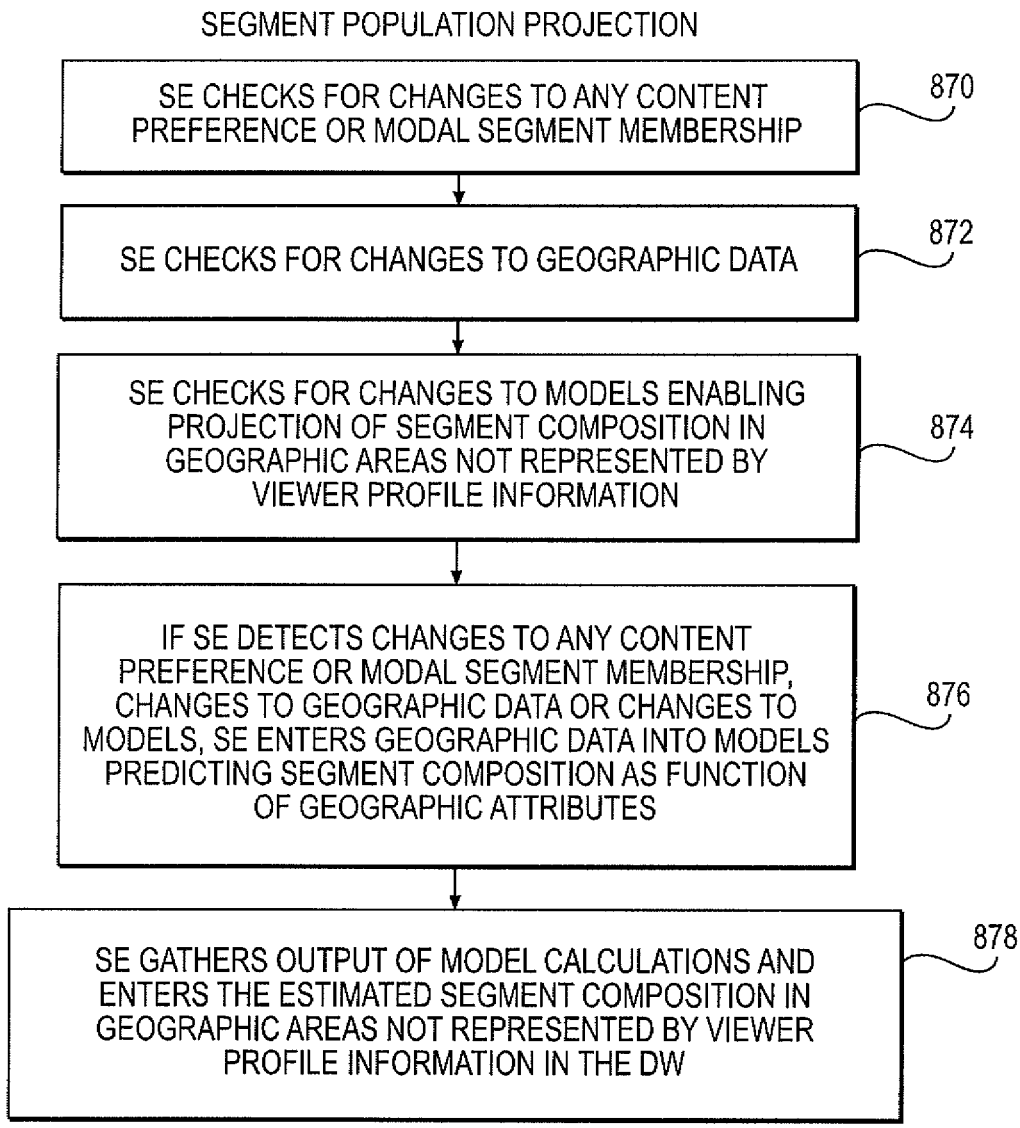
FIG. 8 is a flow chart which illustrates the steps of a computer-implemented method of segment population projection in accordance with an embodiment of the present invention.

With reference to FIGS. 1-2 and 8, in step 870 of FIG. 8, the SE 130 may check for changes to any Content Preference or Modal Segment population (i.e., membership). In step 872, the SE 130 may check for changes to geographic data stored in the DW 120 since it was last used. In step 874, the SE 130 may check for changes to models enabling projection of segment composition for geographic areas not explicitly represented in the viewer profile information. In an embodiment of the present invention, multivariate regression models may be used to project segment composition on geographical regions for which the TV promotion system 100 has not gathered the necessary STB data for determination of Content Preference and/or Modal segments.

In step 876, if the SE 130 detects changes to any Content Preference or Modal Segment population, changes to geographic data, or changes to the models used to project segment compositions onto geographic areas for which less than sufficient viewer profile information is available, the SE 130 may enter geographic data from geographic areas for which sufficient viewer profile information is available into the current models to predict segment composition in the underrepresented geographic areas based on common geographic attributes. In step 878, the SE 130 may gather the output of the predicted segment composition calculations and enter the estimated segment size and compositions for the geographic areas for which insufficient viewer profile information is available to determine segment compositions. In a preferred embodiment, a viewer may be a member of only one of each of the segmentation schemes (i.e., a member of a Content Preference Segment and a member of a Modal Segment, which are distinct segmentation schemes). It is appreciated, however, that a person can be a member of different Content Preference Segments, for example, if such segments are in different domains. It is also appreciated that a viewer may be a member of different Modal Segments for different times of the day, week or month, for example.

Figure 9:
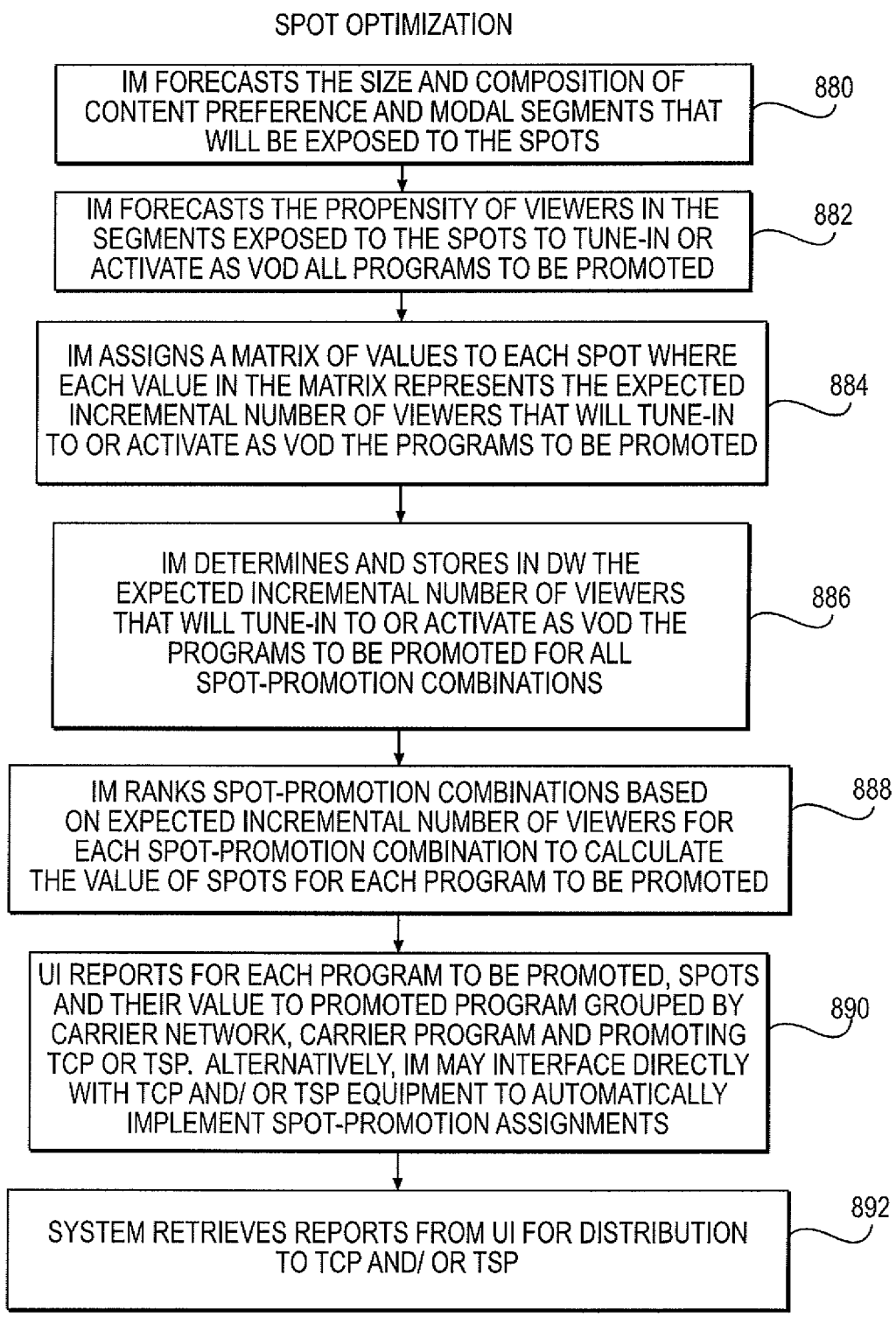
FIG. 9 is a flow chart which illustrates the steps of a computer-implemented method of spot selection optimization in accordance with an embodiment of the present invention.

With reference to FIGS. 1-2 and 9, in step 880 of FIG. 9, the IM 140 may retrieve forecasting models from the DW 120 and use the forecasting models to estimate the size and composition with respect to content preference and modal segmentation of viewer audiences that will be exposed to the spots (as opposed to a geographic region as in step 878).

In step 882, the IM 140 may use forecasting models to estimate the propensity of a segment of viewers exposed to spots to tune-in or activate as VOD one or more TV programs to be promoted. A value may be determined representing the propensity of each viewer segment to tune-in and/or activate as VOD each of the TV programs to be promoted. The forecasting model, and the value determined from it, may be based in part on one or more of the viewer profile information, spot information, and promoted program information. Historical viewer profile information also may be utilized for such forecasting.

In step 884, the IM 140 may enter each of the values determined in the preceding step into a matrix where each value in the matrix represents the expected incremental audience to tune-in to or activate as VOD every TV program to be promoted conditioned on allocating other spots to other programs to be promoted. The resulting matrix may include all possible permutations or combinations of spots and promotions. The forecasting models may result in the determination of and storage of data such as is shown chart 1100 shown in FIG. 15 as part of the matrix that is generated. The chart 1100 may include database information that associates the title, time and channel for a program with its target reach, number of viewers, percentage of viewers, index score and future schedule for cross-network promotion of a particular program.

In step 886, the IM 140 may determine all permutations of spot-promotion combinations for the matrix until all potentially desirable spot-promotion combinations are determined. The IM 140 may then store the incremental number of viewers which are predicted to tune-in to or activate as VOD each TV program to be promoted for each permutation. The incremental number of viewers may be the number of extra viewers predicted to be attracted to view a program utilizing the spot optimization process versus not using it.

Figure 16:
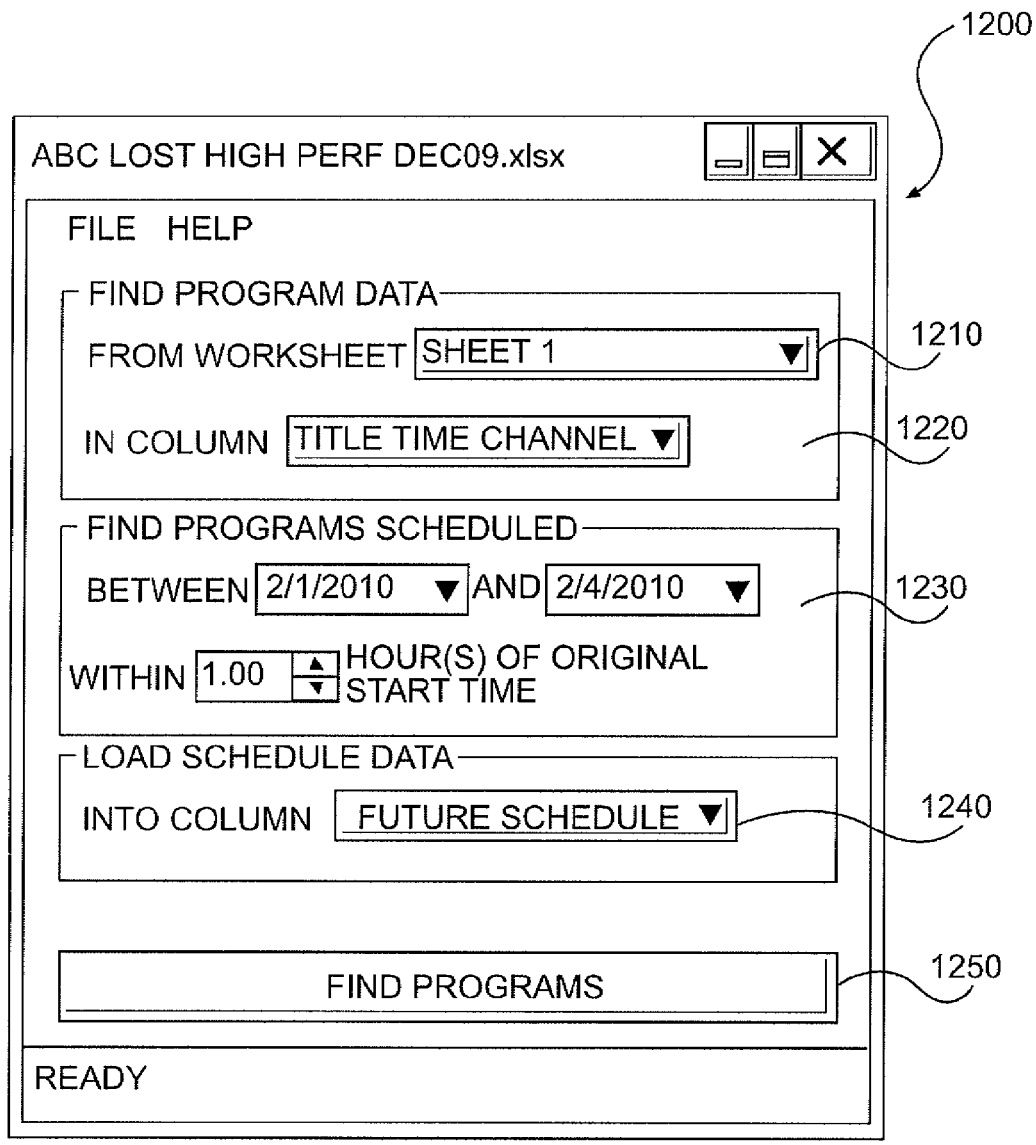
FIG. 16 is an illustration of a computer screen showing a future program finder utility user interface window used for identifying and ranking programs for cross-network promotion.

In step 888, the predicted incremental number of viewers from the previous step may be used by the IM 140 to rank the spot and promotion combinations. A preferred combination may be one that is predicted to increase and preferably optimize the incremental number of viewers that will tune-in to or activate as VOD each of the programs to be promoted. The ranking may be used by the IM 140 to calculate the value of spots and update the value of spots under management by the TV promotion system 100 for each program to be promoted. The data used to determine the ranking may be input to the TV promotion system 100 using a graphic interface 1200 such as shown in FIG. 16. The graphic interface 1200 may include a field 1210 for selecting data for input, such as that shown in FIG. 15, for use in the ranking determination, including data to be input into a "Title-Time (Channel)" field 1220, a program schedule date and temporal proximity field 1230, a "future schedule" field 1240, and a "find programs" button 1250.

In step 890, the IM 140 may cause the UI 110 to create a computer-implemented display through video and/or print a report detailing all spots available for each program to be promoted, spots and their value for each program to be promoted grouped by carrier network, carrier program, and promoting TV service provider and/or TV content provider. The displayed report may indicated the optimal time and channel for delivery of television advertising content, namely the promotion for a program to be promoted. Alternatively, the IM may interface directly with a TV service provider and/or TV content provider to automatically implement spot-promotion assignments for inclusion in future television programming which represent the optimal time and channel for delivery of the television advertising content (i.e., promotion). The reports referenced may be visually perceptible to a user of the UI.

In step 892, the TV promotion system 100 may transmit the reports to the TV content provider and/or TV service provider. The TV content provider and/or TV service provider may be provided with approval authority to implement providing the promotions in the determined optimal spot. Preferably, the TV promotion system 100 may be used to determine optimal cross-network promotion channels and times for promoting one or more TV programs.

Figure 10:
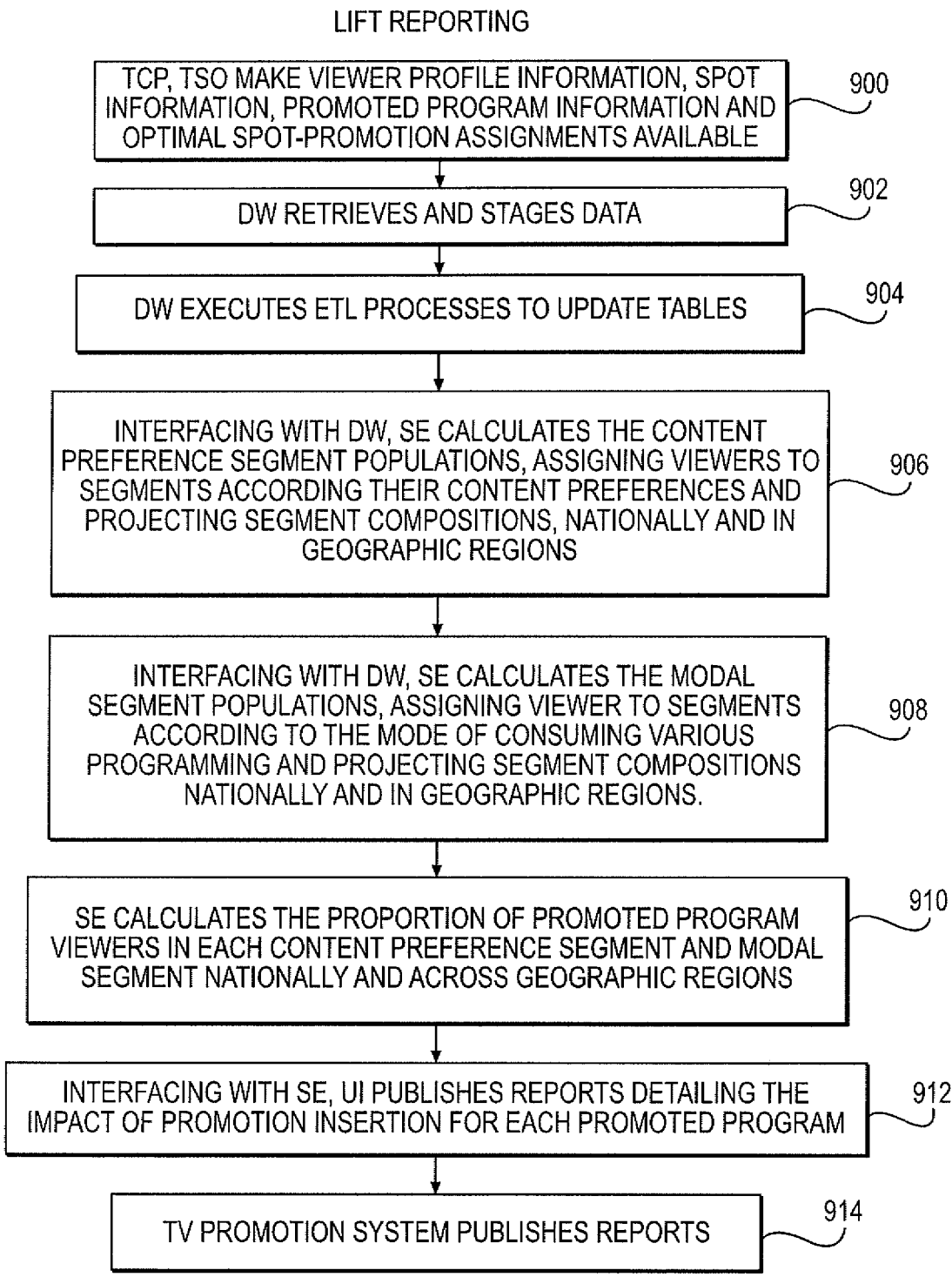
FIG. 10 is a flow chart which illustrates the steps of a computer-implemented method of lift reporting in accordance with an embodiment of the present invention.

With reference to FIG. 10, the TV promotion system 100 may also generate lift reporting so that users, cable operators and cable networks, for example, may evaluate the effectiveness of the TV promotion system. With reference to FIG. 10, in step 900 the viewer profile information made available from the TCP and TSP, as well as spot information, promoted program information and optimal spot-promotion assignment information for past spots may be made available to the system. The system 100 may access such information in response to one or more triggers, such as when the current date is after the promoted program air date, data has been received describing when, on which channels, and/or in which geographic regions promotions for the program aired. A distinction may be made in this data as between data associated with promotions scheduled by the TV promotion system 100 and those scheduled by alternative means. In an alternative embodiment, the trigger may be receipt of data describing the programming and programming schedules for all channels and in all geographic regions where the promotions aired. In still another alternative embodiment, the trigger may be receipt of data describing the STB tune-in to channels in the time period in which the promotions and the promoted program aired.

In steps 902 and 904, the data that triggers lift reporting may be moved to processing locations designed to manage the data and manipulate the data into forms that are useful for reporting.

In steps 906 and 908, similar to steps 842 and 862, the SE may calculate Content Preference and Modal Segment populations. Using these projected segment populations, in step 910 the SE may calculate the proportion of promoted program viewers in each Content Preference Segment and each Modal Segment across geographic regions and/or nationally.

In steps 912 and 914, the UI may access the information determined by the SE in the preceding steps and publish it in one or more reports, both internally and externally.

It will be apparent to those skilled in the art that variations and modifications of the present invention can be made without departing from the scope or spirit of the invention.

What is claimed is:

1. A computer implemented method of determining an optimal time and channel for delivery of television advertising content based on viewer profile information, comprising the steps of:
    collecting viewer profile information for a viewer;
    storing the viewer profile information in a computer memory;
    storing a definition of one or more modal segments of viewers in terms of one or more viewer profile information thresholds in the computer memory;
    assigning the viewer to one or more modal segments based on a computer implemented comparison of the one or more viewer profile information thresholds with the collected viewer profile information and determination of an attention value for the viewer, wherein the attention value is based on a TV View Duration index, a Channel View Duration index, a Genre View Duration index, a Guide Interactions per Time index, and a DVR Interactions per Time index;
    determining with said computer an optimal time and channel for delivery of television advertising content based on viewer assignment to the one or more modal segments and the collected viewer profile information; and
    providing a computer implemented display indicative of the determined optimal time and channel for delivery of the television advertising content.

2. The method of claim 1 wherein the step of assigning the viewer to one or more modal segments is further based on determination of an exploration utility value for the viewer.

3. The method of claim 2 wherein the exploration utility value is based on one or more indices selected from the group consisting of: a Genre Familiarity index, a Program Familiarity index, a Channels Viewed index, a Genres Viewed index, and a Guide Interaction Duration index.

4. The method of claim 2 wherein the exploration utility value is based on a Genre Familiarity index, a Program Familiarity index, a Channels Viewed index, a Genres Viewed index, and a Guide Interaction Duration index.

5. The method of claim 1 wherein the step of collecting viewer profile information comprises collecting viewer attribute data selected from the group consisting of: income, employment, race, ethnicity, age, gender, marital status, parental status, children in household, number of people in household, number of televisions, and television subscription data.

6. The method of claim 1 wherein the step of determining an optimal time and channel for delivery of television advertising content is further based on geographic data, wherein said geographic data comprises data selected from the group consisting of: climate, population density, ethnic population quantity, ethnic population distribution, race population quantity, race population distribution, income distribution, age distribution, gender quantity, gender distribution, and marital status distribution data.

7. The method of claim 1 wherein the computer memory comprises a computer database.

8. The method of claim 1, further comprising the steps of:
    determining the number of viewers assigned to the one or more modal segments in a geographic area;
    determining geographic data relating to the viewers in the one or more modal segments in the geographic area; and
    estimating with the computer a number of viewers to be associated with the one or more modal segments outside of the geographic area based on the number of viewers assigned to the one or more modal segments in the geographic area and the geographic data,
    wherein the step of determining an optimal time and channel for delivery of television advertising content is further based on the estimating of the number of viewers to be associated with the one or more modal segments outside of the geographic area.

9. The method of claim 8, wherein the step of determining with said computer the optimal time and channel for delivery of television advertising content is based on a computer implemented estimate of the propensity of viewers in the one or more modal segments exposed to the television advertising content to tune in to a television program promoted by the television advertising content.

10. The method of claim 9, wherein the television program is a video-on-demand program.

11. The method of claim 9, wherein the computer implemented estimate of the propensity of viewers in the one or more modal segments to to tune in to the television program is based on the viewer profile information.

12. The method of claim 9, wherein the step of determining with said computer the optimal time and channel for delivery of television advertising content is based on a computer implemented estimate of a number of viewers in the one or more modal segments that will to tune in to the television program promoted by the television advertising content.

13. The method of claim 12, wherein the step of determining with said computer the optimal time and channel for delivery of television advertising content is further based on ranking a plurality of computer implemented estimates of the number of viewers, said ranking indicating the relative value of delivering the television advertising content at a particular time on a particular channel.

14. The method of claim 12, further comprising the step of re-ranking the computer implemented estimate of the number of viewers in response to an input received by said computer from a cable operator or a cable network provider.

15. The method of claim 1 wherein said television advertising content is a cross-network promotion.

16. The method of claim 6 wherein said television advertising content is a cross-network promotion.

17. The method of claim 8 wherein said television advertising content is a cross-network promotion.

18. A computer implemented method of determining an optimal time and channel for delivery of television advertising content based on viewer profile information, comprising the steps of:
    collecting viewer profile information for a viewer;
    storing the viewer profile information in a computer memory;
    storing a definition of one or more modal segments of viewers in terms of one or more viewer profile information thresholds in the computer memory;

assigning the viewer to one or more modal segments based on a computer implemented comparison of the one or more viewer profile information thresholds with the collected viewer profile information and a determination of an attention value and an exploration utility value for the viewer, wherein the exploration utility value is based on a Genre Familiarity index, a Program Familiarity index, a Channels Viewed index, a Genres Viewed index, and a Guide Interaction Duration index;

determining with said computer an optimal time and channel for delivery of television advertising content based on viewer assignment to the one or more modal segments and the collected viewer profile information; and providing a computer implemented display indicative of the determined optimal time and channel for delivery of the television advertising content.

19. The method of claim 18 wherein the step of collecting viewer profile information comprises collecting viewer attribute data selected from the group consisting of: income, employment, race, ethnicity, age, gender, marital status, parental status, children in household, number of people in household, number of televisions, and television subscription data.

20. The method of claim 18 wherein the step of determining an optimal time and channel for delivery of television advertising content is further based on geographic data, wherein said geographic data comprises data selected from the group consisting of: climate, population density, ethnic population quantity, ethnic population distribution, race population quantity, race population distribution, income distribution, age distribution, gender quantity, gender distribution, and marital status distribution data.

21. A computer implemented method of determining an optimal time and channel for delivery of television advertising content based on viewer profile information, comprising the steps of:

collecting viewer profile information for a viewer;

storing the viewer profile information in a computer memory;

storing a definition of one or more modal segments of viewers in terms of one or more viewer profile information thresholds in the computer memory;

assigning the viewer to one or more modal segments based on a computer implemented comparison of the one or more viewer profile information thresholds with the collected viewer profile information and a determination of an attention value and an exploration utility value for the viewer, wherein the attention value is based on one or more indices selected from the group consisting of: a TV View Duration index, a Channel View Duration index, a Genre View Duration index, a Guide Interactions per Time index, and a DVR Interactions per Time index, and the exploration utility value is based on a Genre Familiarity index, a Program Familiarity index, a Channels Viewed index, a Genres Viewed index, and a Guide Interaction Duration index;

determining with said computer an optimal time and channel for delivery of television advertising content based on viewer assignment to the one or more modal segments and the collected viewer profile information; and providing a computer implemented display indicative of the determined optimal time and channel for delivery of the television advertising content.

* * * * *